(12) United States Patent
Matsumura et al.

(10) Patent No.: US 11,966,657 B2
(45) Date of Patent: Apr. 23, 2024

(54) INFORMATION PROCESSING APPARATUS

(71) Applicant: NTT DOCOMO, INC., Chiyoda-ku (JP)

(72) Inventors: Kenichirou Matsumura, Chiyoda-ku (JP); Kuniichiro Naruse, Shinagawa-ku (JP); Keita Saito, Shibuya-ku (JP); Akira Kurosawa, Shibuya-ku (JP); Hiroki Takagaki, Shibuya-ku (JP); Kiwako Miura, Shibuya-ku (JP); Yuki Kobayashi, Shibuya-ku (JP); Takehisa Gokaichi, Shibuya-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 18/040,914

(22) PCT Filed: Dec. 28, 2020

(86) PCT No.: PCT/JP2020/049235
§ 371 (c)(1),
(2) Date: Feb. 7, 2023

(87) PCT Pub. No.: WO2022/049794
PCT Pub. Date: Mar. 10, 2022

(65) Prior Publication Data
US 2023/0297308 A1    Sep. 21, 2023

(30) Foreign Application Priority Data
Sep. 7, 2020 (JP) .................. 2020-149625

(51) Int. Cl.
*G06F 3/14* (2006.01)
*G06F 3/04817* (2022.01)
*G06F 3/0488* (2022.01)

(52) U.S. Cl.
CPC ............ *G06F 3/14* (2013.01); *G06F 3/04817* (2013.01); *G06F 3/0488* (2013.01)

(58) Field of Classification Search
CPC ....... G06F 3/14; G06F 3/0488; G06F 3/04817
See application file for complete search history.

(56) References Cited

U.S. PATENT DOCUMENTS

| 2006/0212819 A1* | 9/2006 | Tobioka | G06F 3/04817 |
| | | | 715/764 |
| 2013/0210488 A1* | 8/2013 | Lee | H04N 21/4312 |
| | | | 455/557 |

(Continued)

FOREIGN PATENT DOCUMENTS

| JP | 2012-243116 A | 12/2012 |
| JP | 2018-36684 A | 3/2018 |
| WO | WO 2013/121458 A1 | 8/2013 |

OTHER PUBLICATIONS

International Search Report dated Apr. 6, 2021 in PCT/JP2020/049235, filed on Dec. 28, 2020, citing documents 1, 16-17 therein, 4 pages.

(Continued)

*Primary Examiner* — Muhammad N Edun
(74) *Attorney, Agent, or Firm* — Oblon, McClelland, Maier & Neustadt, L.L.P.

(57) ABSTRACT

An information processing apparatus includes: a receiver configured to receive an input operation of a user; and a display controller configured to display, in a display area having a first area and a second area, an image. The display controller includes: an icon controller configured to display, in the second area, first icons associated one-to-one with different layouts in splitting the first area, and a first splitter configured to split the first area into split areas based on a (Continued)

layout corresponding to a selected first icon to when the receiver receives an input operation for selecting any of the first icons.

8 Claims, 18 Drawing Sheets

(56) References Cited

U.S. PATENT DOCUMENTS

| | | | |
|---|---|---|---|
| 2015/0025718 A1 | 1/2015 | Miichi et al. | |
| 2015/0339018 A1* | 11/2015 | Moon | G06F 3/0482 715/765 |
| 2019/0037088 A1* | 1/2019 | Yamamoto | G06F 3/1236 |

OTHER PUBLICATIONS

Japanese Office Action dated Jan. 4, 2024, issued in Japanese Patent Application No. 2022-546874 (with English translation).

* cited by examiner

FIG. 5

| App Icon I | App Execution Character String | App Icon Path | |
|---|---|---|---|
| app1 | SNS.apk | /storage/···/SNS.png | ICIR_1 |
| app2 | Web.apk urlA | /storage/···/urlA.png | ICIR_2 |
| app3 | Mail.apk | /storage/···/Mail.png | ICIR_3 |
| app4 | Call.apk | /storage/···/Call.png | ICIR_4 |

ICI

FIG. 6

| Split Icon ID | The Number of Splits | Split Area ID | Position and Size of Split Display Area | Split Icon Path | |
|---|---|---|---|---|---|
| si_a | 2 | sp_a1, sp_a2 | (0,0,1079,2159), (1080,0,1079,2159) | /storage/···/si_a.png | SPIR_a |
| si_b | 2 | ··· | ··· | ··· | SPIR_b |
| si_c | 3 | ··· | ··· | ··· | SPIR_c |
| si_d | 3 | ··· | ··· | ··· | SPIR_d |
| si_e | 4 | sp_e1, sp_e2, sp_e3, sp_e4 | (0,0,1079,1079), (1080,0,1079,1079), (0,1080,1079,1079), (1080,1080,1079,1079) | /storage/···/si_e.png | SPIR_e |

SPI

FIG. 7

| Selected Split Icon ID | Split Area ID | App Icon I | |
|---|---|---|---|
| si_a | sp_a1 | app1 | RI |
| | sp_a2 | app3 | |

INFORMATION PROCESSING APPARATUS

TECHNICAL FIELD

The present invention relates to information processing apparatuses.

BACKGROUND ART

In recent years, information processing apparatuses such as smartphones and personal computers, which can cause multiple images, each corresponding to one or more pieces of software to be displayed in one of multiple areas obtained by splitting a display area, have become widespread (see, for example, Patent Document 1).

RELATED ART DOCUMENT

Patent Document

Patent Document 1: Japanese Patent Application Laid-Open Publication No. 2018-36684

SUMMARY OF THE INVENTION

Problem to be Solved by the Invention

However, in the related art, the user of the information processing apparatus needs to perform operations to decide positions and sizes of the multiple areas obtained by splitting the display area, which places a burden on the user.

Means for Solving the Problem

In order to solve the above problem, a receiver configured to receive an input operation of a user; and a display controller configured to display, in a display area having a first area and a second area, an image, the display controller includes: an icon controller configured to display, in the second area, a plurality of first icons associated one-to-one with a plurality of different layouts in splitting the first area, and a first splitter configured to split the first area into a plurality of split areas based on a layout corresponding to a selected first icon when the receiver receives an input operation for selecting any of the plurality of first icons.

Effect of the Invention

According to the present invention, it is possible to reduce the burden on the user in splitting the display area.

BRIEF DESCRIPTION OF THE DRAWINGS

FIG. 5 is a diagram illustrating an example of app icon information ICI.

FIG. 6 is a diagram illustrating an example of split icon information SPI.

FIG. 7 is a diagram illustrating an example of association information RI.

MODES FOR CARRYING OUT THE INVENTION

A. Embodiment

Hereinafter, an information processing apparatus 1 according to the present embodiment will be described.

A.1. Overview of Information Processing Apparatus 1

Figure 1:
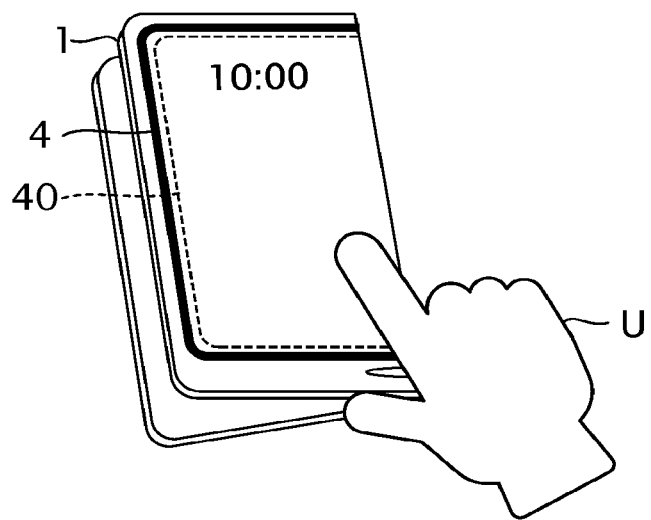
FIG. 1 is a perspective view illustrating an external appearance of an information processing apparatus 1.

FIG. 1 is a perspective view illustrating an external appearance of the information processing apparatus 1. The information processing apparatus 1 is assumed to be a smartphone or a tablet terminal. The information processing apparatus 1 includes a touch panel 4 including a display area 40. Furthermore, the information processing apparatus 1 can be folded with the surface on which the touch panel 4 is provided facing outward. The information processing apparatus 1 illustrated in FIG. 1 is in a folded state. With the information processing apparatus 1 being folded, the touch panel 4 displays an image only in one area of the areas obtained by splitting the display area 40 into two areas. A user U who uses the information processing apparatus 1 operates the information processing apparatus 1 by touching the touch panel 4 in the one area described above.

Figure 2:
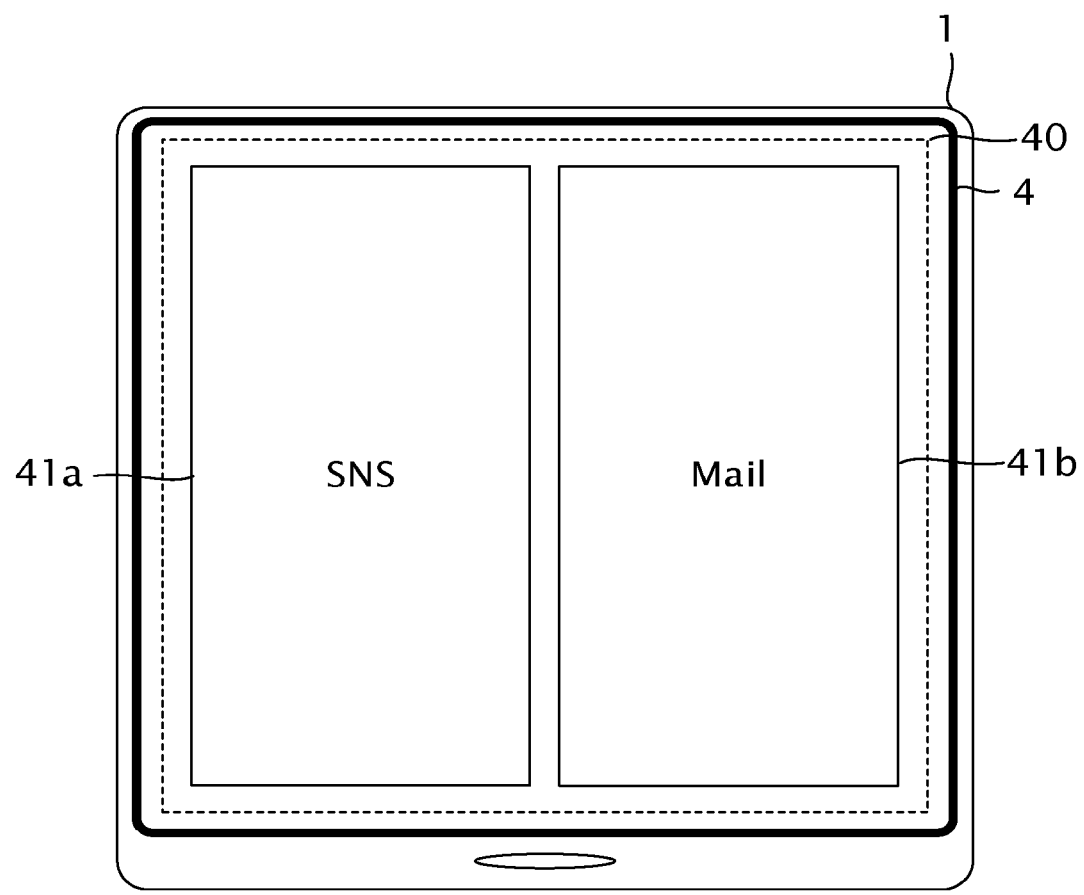
FIG. 2 is a plan view illustrating an external appearance of the information processing apparatus 1 that is unfolded.

FIG. 2 is a plan view illustrating an external appearance of the information processing apparatus 1 that is unfolded. In response to the information processing apparatus 1 being unfolded, the touch panel 4 displays an image in the entire area of the display area 40. With the information processing apparatus 1 being unfolded, an area in which an image is displayed is wider than that in a case of the folded information processing apparatus 1. Then, the information processing apparatus 1 splits the display area 40 into split display areas 41, and causes the image indicated by the image information generated by application software to be displayed in each of the split display areas 41. With the information processing apparatus 1 being unfolded, the user U operates the information processing apparatus 1 by touching the touch panel 4 in the entire area of the display area 40.

The present embodiment is not limited to a case in which the image indicated by the image information generated by the application software is displayed in each of the split display areas 41. It is possible to display an image indicated by the image information generated by system software, such as a operating system software (OS), and a device driver. In the following description, only application software will be described for ease of explanation. In addition, the application software is referred to as an "app".

In one example illustrated in FIG. 2, the information processing apparatus 1 splits the display area 40 into two split display areas 41, i.e., a split display area 41a and a split display area 41b. In the following description, when elements of the same type are distinguished from each other, individual reference numerals such as the split display area 41a and the split display area 41b will be used. When elements of the same type are not distinguished from each other, the same numeral among reference numerals will be used as that for the split display area 41.

In one example, as illustrated FIG. 2, the touch panel 4 displays an image indicated by image information generated by a social networking service (SNS) app on the split display area 41a, and displays an image indicated by image information generated by an email app on the split display area 41b.

Figure 3:
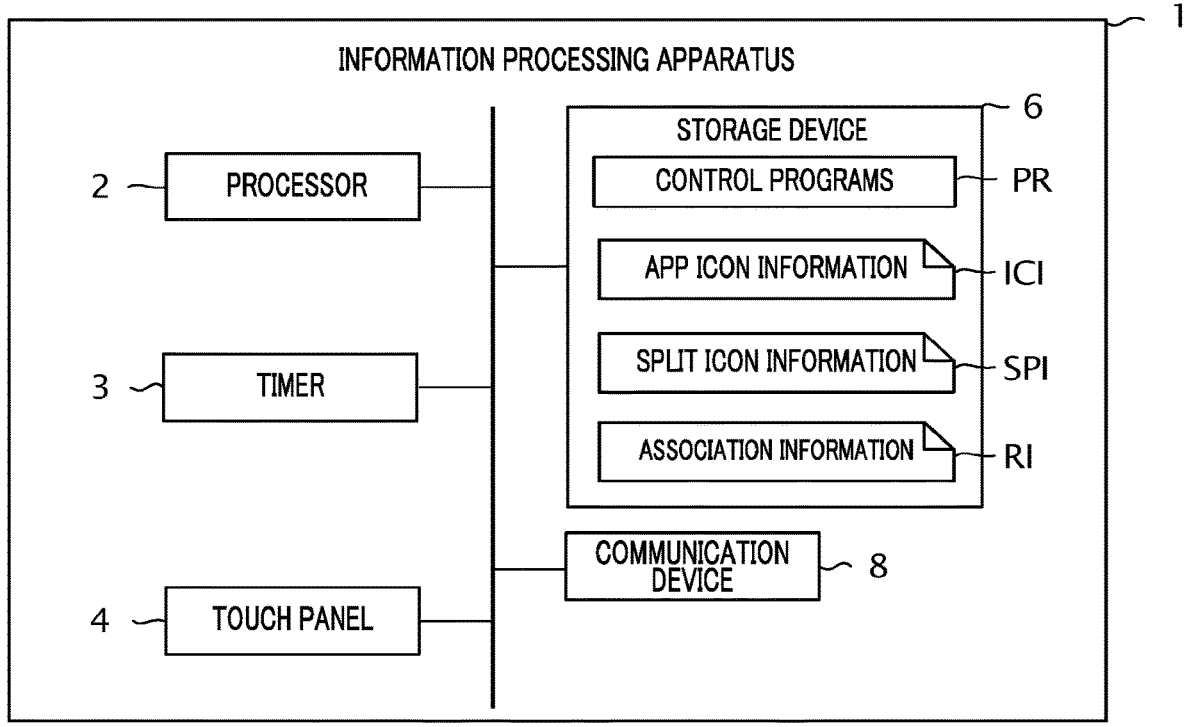
FIG. 3 is a block diagram illustrating a configuration of the information processing apparatus 1.

FIG. 3 is a block diagram illustrating a configuration of the information processing apparatus 1. The information processing apparatus 1 includes, for example, a processor 2, a timer 3, a touch panel 4, a storage device 6, and a communication device 8. The respective elements of the information processing apparatus 1 are mutually connected by a single bus or more than one bus for communicating information.

The processor 2 controls the entire information processing apparatus 1, and includes, for example, one or more chips. The processor 2 includes, for example, a central processing unit (CPU) including an interface with a peripheral device, an arithmetic device, a register. Some or all of the functions of the processor 2 may be implemented by hardware such as a digital signal processor (DSP), an application specific integrated circuit (ASIC), a programmable logic device (PLD), or a field programmable gate array (FPGA). The processor 2 executes various types of processing in parallel or sequentially.

The timer 3 clocks time on the basis of clock signals, and generates time information indicating a clocking result. The touch panel 4 includes a display device that displays an image and an input device that receives an input operation by the user U. The touch panel 4 is made of a bendable material.

The storage device 6 is a recording medium that is readable by the processor 2. The storage device 6 may include, for example, at least one of a read only memory (ROM), an erasable programmable ROM (EPROM), an electrically erasable programmable ROM (EEPROM), a random access memory (RAM), and the like. The storage device 6 may be referred to as a register, a cache, a main memory (main storage device), or the like. The storage device 6 stores programs including control programs PR executed by the processor 2, app icon information ICI, split icon information SPI, association information RI, various types of information used by the processor 2, and the like.

Figure 4:
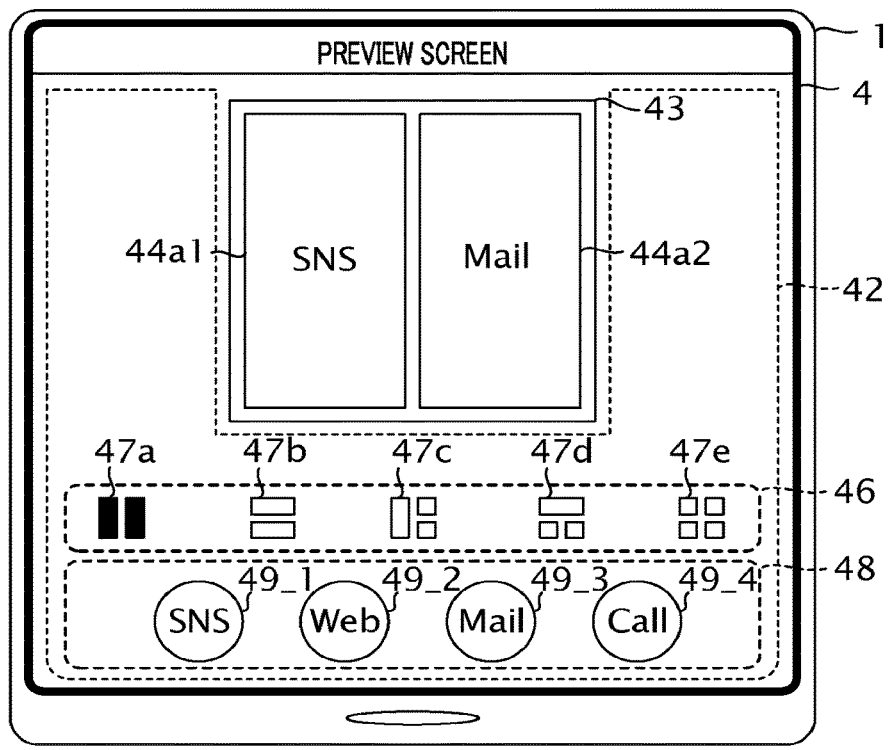
FIG. 4 is a diagram illustrating an example of a preview screen.

The app icon information ICI, the split icon information SPI, and the association information RI are used when the display area 40 is split. In the present embodiment, the user U can split the display area 40 into split display areas 41 by operating the touch panel 4, and can designate an image to be displayed in each of the split display areas 41. When the user U splits the display area 40 and designates an image to be displayed in each of the split display areas 41, the preview screen illustrated in FIG. 4 is displayed on the touch panel 4. The preview screen is for the user U to confirm in advance how the display area 40 is to be split and what kind of image is displayed in each of the split display areas 41.

As the preview screen is displayed on the touch panel 4, the user U can confirm a split layout in splitting the display area 40 into the split display areas 41. The split layout of the display area 40 is the position of each of the split display areas 41 and the size of each split display area 41. For simplification of description, in the embodiment, the shape of the split display area 41 will be described as a rectangle, but the present invention is not limited thereto. The shape of the split display area 41 may be a polygon or a circle. That is, the split layout of the display area 40 may include the shape in addition to the position and size of each split display area 41.

FIG. 4 is a diagram illustrating an example of a preview screen. The preview screen is displayed in the display area 40. The preview screen has a preview area 43 and a non-preview area 42. The preview area 43 is used to confirm in advance an image to be displayed in the display area 40 after the display area 40 is split based on the split layout determined by the user U. In one example illustrated in FIG. 4, the preview area 43 is located at the center of the upper portion of the display area 40. The non-preview area 42 is an area of the display area 40 that does not overlap with the preview area 43. The preview area 43 is an example of a "first area". The non-preview area 42 is an example of a "second area".

The non-preview area 42 has a split icon area 46 and an app icon area 48. The split icon area 46 is an area in which split icons 47 are arranged. The split icons 47 correspond one-to-one to layouts in splitting the display area 40. In FIG. 4, split icons 47a, 47b, 47c, 47d, and 47e are illustrated as examples of the split icon 47. The app icon area 48 is an area in which app icons 49 are arranged. The app icons 49 correspond to more than one app. Two different app icons 49 may correspond to the same app. In one example illustrated in FIG. 4, the split icon area 46 is located below the preview area 43. The app icon area 48 is located below the split icon area 46.

The split icon 47 is an example of a "first icon". The app icons 49 are an example of a "second icon". On the preview screen, the touch panel 4 displays two types of icons, i.e., the split icons 47 and the app icons 49.

In the preview area 43, a preview image, in which the display area 40 is split depending on the split layout of the display area 40 designated by the user U, is displayed. The preview image displayed in the preview area 43 is obtained by arranging each image (hereinafter, "display image"). Each display image indicates the processing content of the app in each of the split areas 44 obtained by splitting the preview area 43 depending on the split layout indicated by the split icon 47 currently selected by the user U. The user U can randomly select the split icon 47 by tapping any one of the split icons 47. Each of the split areas 44 is used to simulate one split display area 41. The display image is indicated by image information generated by the is app when the app is currently being executed. The display image is indicated by image information generated by the app in the past in when the app is not currently being executed. However, when the app is not currently being executed and image information generated in the past is not stored in the storage device 6, the display image may be an enlarged image of the app.

As described above, the split icon 47 indicates the split layout in splitting the display area 40 into the plurality of split display areas 41. In the preview area 43, the split layout corresponding to the split icon 47 selected by the user U is displayed. Therefore, the split icon 47 corresponds to the split layout in splitting the preview area 43. For example, the split icon 47a indicates a layout of equally splitting the display area 40 illustrated in FIG. 2 into two, left and right split display areas 41. Therefore, the split icon 47a corresponds to the split layout in splitting the preview area 43 into the two, left and right split areas 44. Therefore, the split icon 47b corresponds to the split layout in splitting the preview area 43 into two, upper and lower split areas 44. The split icon 47c corresponds to the layout of splitting the preview area 43 into three split areas 44, that is, a left split area 44, an upper right split area 44, and a lower right split area 44. The upper right split area 44 and the lower right split area 44 of the split icon 47c have substantially the same size. The split icon 47d corresponds to the layout of splitting the preview area 43 into three split areas 44, that is, an upper split area 44, a lower left split area 44, and a lower right split area 44. The lower left split area 44 and the lower right split area 44 of the split icon 47d have substantially the same size. The split icon 47e corresponds to the layout of equally splitting the display area 40 into four split areas 44, that is, an upper left split area 44, an upper right split area 44, a lower left split area 44, and a lower right split area 44. From among the split icons 47, the currently selected split icon 47 is highlighted. In one example illustrated in FIG. 4, the split icon 47a is highlighted. With the highlighted display, the user U can notice that the preview area 43 is split depending on the split layout corresponding to the highlighted split icon 47.

Each split icon 47 indicates the areas obtained by reducing each of the split display areas 41 split based on the split layout corresponding to the split icon 47. For example, the split icon 47a is an image in which two vertically long rectangles are arranged along the left-right direction. In a similar manner, the split icon 47b is an image in which two horizontally long rectangles are arranged along the vertical direction.

A display image, which corresponds to the app icon 49 designated by a user operation from among the app icons 49, is displayed in each split area 44. FIG. 4 illustrates, as the app icons 49, an SNS app icon 49_1 corresponding to an SNS app, a Web app icon 49_2 corresponding to a Web app, an email app icon 49_3 corresponding to an email app, and a phone app icon 49_4 corresponding to a phone app. In one example illustrated in FIG. 4, four app icons 49 are displayed in the app icon area 48, but more than four app icons 49 may be arranged. Furthermore, the processor 2 may display an app icon 49 different from the currently arranged app icon 49 in response to a flick operation in the right direction or the left direction performed within the app icon area 48.

In an example of FIG. 4, the split icon 47a is selected, in which state, the preview area 43 is split into two, left and right split areas 44a1 and 44a2. In the split area 44a1, a display image corresponding to the SNS app is arranged. In the split area 44a2, a display image corresponding to an email app is arranged. When the user U decides the split layout indicated by the preview area 43 illustrated in FIG. 4, in practice, as illustrated in FIG. 2, the image indicated by the image information generated by the SNS app is displayed in the split display area 41a of the touch panel 4. Furthermore, the image indicated by the image information generated by the email app is displayed in the split display area 41b.

FIG. 5 is a diagram illustrating an example of app icon information ICI. The app icon information ICI includes an app icon ID, an app execution character string, and an app icon path, which are associated with each other for each app icon 49. The app icon information ICI illustrated in FIG. 5 includes records ICIR_1 to ICIR_4. The app icon ID is used to discriminate the app icon 49. The app execution character string is an instruction sentence used in executing an app. The app execution character string is a character string obtained by adding a character string as an argument to the file name of the app. For example, the app execution character string indicated by the record ICIR_2 is "Web.apk urlA". "Web.apk urlA" is an instruction for displaying the Web page designated by urlA using the Web app. The app execution character string may be a file name of the app. The app icon path shows a file path in which image information of the app icon 49 is stored.

FIG. 6 is a diagram illustrating an example of the split icon information SPI. The split icon information SPI includes the split icon ID, the number of splits, the split area ID, the position and size of the split display area 41, and the split icon path, which are associated with each other for each split icon 47. The split icon information SPI illustrated in FIG. 6 includes records SPIR_a to SPIR_e.

The split icon ID is used to discriminate the split icon 47. The number of splits is set to the number of split areas 44 when the preview area 43 is split. The split area ID is used to discriminate each of the plurality of split areas 44 when the preview area 43 is split. The position and size of the split display area 41 indicate the position and size of the split display area 41 corresponding to each of the split areas 44. More specifically, the position and size of the split display area 41 are a coordinate value in the horizontal direction of the upper left vertex of the split display area 41, a coordinate value in the vertical direction of the upper left vertex, a value indicating the width of the split display area 41, and a value indicating the height of the split display area 41. The split icon path is a file path in which image information of the split icon 47 is stored.

FIG. 7 is a diagram illustrating an example of the association information RI. The association information RI includes a selected split icon ID indicating the split icon 47 selected by the user U among the split icons 47, a split area ID for discriminating each of the split areas 44 corresponding to the split icon 47, and an app icon ID associated with each of the split areas 44, which are associated with each other. The association information RI illustrated in FIG. 7 indicates that the split icon 47a of which split icon ID is "si_a" is selected. Furthermore, the association information RI indicates that the split icon 47a corresponds to a layout of splitting the preview area 43 into the split area 44a1 of which the split area ID is "sp_a1" and the split area 44a2 of which split area ID is "sp_a2". Furthermore, the association information RI indicates that the split area 44a1 is associated with the SNS app icon 49_1 of which app icon ID is "app1", and the split area 44a2 is associated with the email app icon 49_3 of which app icon ID is "app3".

The description returns to FIG. 3. The communication device 8 is hardware for communicating with other devices. The communication device 8 is also called, for example, a network device, a network controller, a network card, a communication module.

A-2. Overview of Information Processing Apparatus 1

Figure 8:
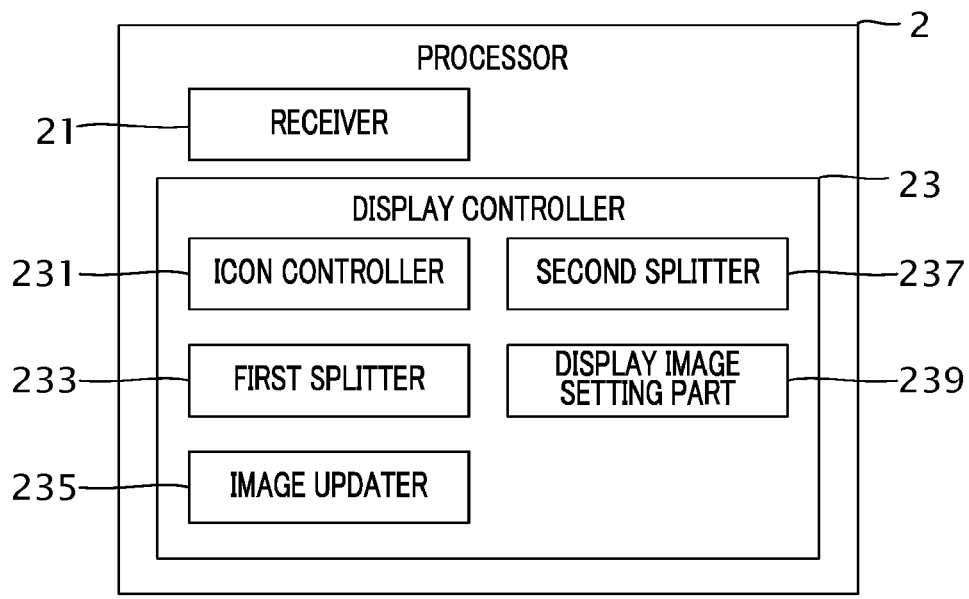
FIG. 8 is a diagram illustrating functions of the information processing apparatus 1.

FIG. 8 is a diagram illustrating functions of the information processing apparatus 1. The processor 2 functions as a receiver 21 and a display controller 23 by reading the control program PR from the storage device 6 and executing the read control program PR. The display controller 23 includes an icon controller 231, a first splitter 233, an image updater 235, a second splitter 237, and a display image setting part 239.

The receiver 21 receives an input operation of the user U. Specifically, an input operation of the user U is received based on operation information output from the touch panel 4. The operation information indicates an input operation of the user U on the touch panel 4. The display controller 23 displays an image in the display area 40. The icon controller 231 displays split icons 47 associated one-to-one with layouts for splitting the preview area 43 in the split icon area 46. Furthermore, the display controller 23 changes display content of the display area 40 in response to the input operation received by the receiver 21. Hereinafter, functions of the processor 2 will be described in the following cases (1) to (4): In response to each change in the display content of the display area 40, (1) a case in which a tap operation to the split icon 47 by the user U is received by the receiver 21, (2) in a case in which a drag and drop operation of the app icon 49 to the split area 44 by the user U is received by the receiver 21, (3) in a case in which an input operation for reducing the split area 44 by the user U is received by the receiver 21, and (4) in a case in which a double-tap operation to the split area 44 by the user U is received by the receiver 21.

A-2-1. A Case in which a Tap Operation to a Split Icon 47 is Received by the Receiver 21

Examples of the tap operation to the split icon 47 include (i) tapping the split icon 47 once, (ii) tapping a certain split icon 47 once and then tapping another split icon 47, and (iii) tapping a certain split icon 47 once, tapping another split icon 47, and then tapping again the split icon 47 that was tapped first.

A-2-1-1. Tapping Split Icon 47 Once

When a tap operation to any one of the split icons 47 by the user U is received by the receiver 21, the first splitter 233 splits the preview area 43 into the split areas 44 based on a split layout corresponding to the tapped split icon 47. The tap operation to any one of the split icons 47 by the user U is an example of the "input operation for selecting any one of the first icons".

A-2-1-2. Tapping a Certain Split Icon 47 Once and then Tapping Another Split Icon 47

When two different split icons 47 are sequentially tapped, there are three cases: the number of the split areas 44 may be the same between the two split icons, 47, it may be increased, and it may be decreased. Each case will be described. In the following description, a split layout corresponding to the split icon 47 tapped first is referred to as a "layout A", and a split layout corresponding to the split icon 47 tapped for the second time is referred to as a "layout B".

A-2-1-2-1. A Case in which the Number of the Split Areas 44 is the Same

When the split layout of the preview area 43 changes from the layout A into the layout B, it is assumed that a display image is displayed in each of the split areas 44 defined by the layout A. In this state, when the preview area 43 is split into the split areas 44 corresponding to the layout B by the first splitter 233, the image updater 235 displays, in any one of the split areas 44 corresponding to the layout B, each display image displayed in the split areas 44 corresponding to the layout A. That is, the display image displayed based on the layout A is taken over in the split layout based on the layout B, and it is displayed in the split area 44. Therefore, when the split layout is switched from the layout A to the layout B, the user U does not need to drag and drop the app icon 49 to each split area 44 of the layout B.

A-2-1-2-2. A Case in which the Number of the Split Areas 44 is Increased

When the split layout of the preview area 43 changes from the layout A into the layout B, it is assumed that a display image is displayed in each of the split areas 44 defined by the layout A. In this state, when the preview area 43 is split into the split areas 44 corresponding to the layout B by the first splitter 233, the image updater 235 displays, in any one of the split areas 44 corresponding to the layout B, each display image displayed in the split areas 44 corresponding to the layout A. When the number of the split areas 44 is increased, the layout A is an example of a "first layout", and the layout B is an example of a "second layout".

Figure 9:
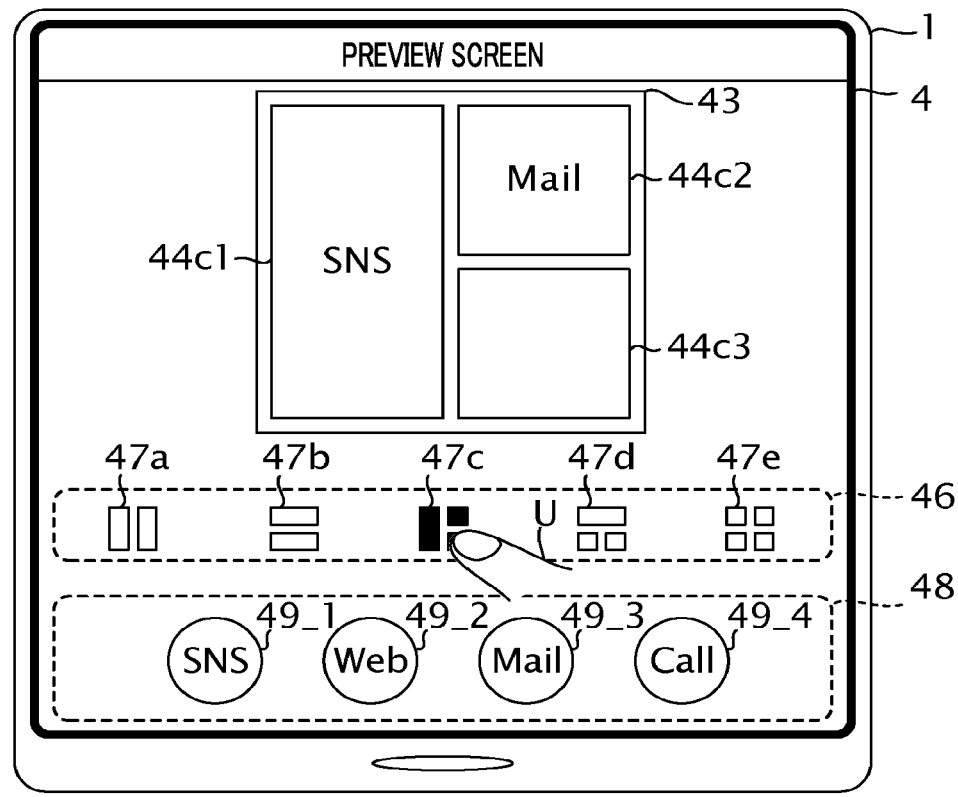
FIG. 9 is a diagram illustrating a preview screen when the number of split areas 44 is increased.

Hereinafter, processing of the image updater 235 will be described with two examples: a case in which the preview area 43 illustrated in FIG. 4 is the layout A, and a case in which the preview area 43 illustrated in FIG. 9 is the layout B. FIG. 4 shows a state after the split icon 47a is tapped by the user U. The number of the split areas 44 defined by the split icon 47a is two. In this state, as illustrated in FIG. 9, it is assumed that the split icon 47c is tapped by the user U. The number of the split areas 44 defined by the split icon 47c is three. Therefore, the number of split areas 44 defined by the layout B is increased from the number of split areas 44 defined by the layout A.

FIG. 9 is a diagram illustrating a preview screen when the number of the split areas 44 is increased. When the split icon 47c is tapped by the user U, the first splitter 233 splits the preview area 43 into three split areas 47c, that is, split areas 44c1, 44c2, and 44c3 corresponding to the split icon 44c. The image updater 235 displays, in any one of the split areas 44c1, 44c2, and 44c3, the display images corresponding to the split icon 47a, which have been displayed in the split area 44a1 and in the split area 44a2. In one example illustrated FIG. 9, the image updater 235 displays, in the split area 44c1, the display image corresponding to the SNS app, which has been displayed in the split area 44a1. Furthermore, the image updater 235 displays, in the split area 44c2, the display image corresponding to the email app, which has been displayed in the split area 44a2.

A-2-1-2-3. A Case in which the Number of the Split Areas 44 is Decreased

When the split layout of the preview area 43 changes from the layout A into the layout B, the icon controller 231 displays, in any one of the split areas 44 corresponding to the layout B, each of the display images displayed in the split areas 44 corresponding to the layout A. Here, each of the display images to be displayed is one of the display images displayed by the display controller 23 in the preview area 43 split by the first splitter 233 based on the layout A to be displayed. However, when the number of splits of the layout B is decreased from the number of splits of the layout A, not all of the display images which have been displayed in the split areas 44 split based on the layout A can be displayed in the split areas 44 split based on the layout B. Thus, from among the display images displayed in each of the split areas 44 split based on the layout A, the icon controller 231 generates one or more new app icons 49 corresponding to one or more display images that are not displayed in the split areas 44 split based on the layout B. Then the icon controller 231 displays, in a predetermined area 50 (FIG. 11) of the non-preview area 42, the new app icons 49. When the new app icon 49 is dragged and dropped to any one of the split areas 44 by the user U, the image updater 235 displays, in the split area 44 that is a drop destination, a display image corresponding to the new app icon 49. When the number of the split areas 44 is decreased, the layout A is an example of the "second layout", and the layout B is an example of the "first layout".

Figure 10:
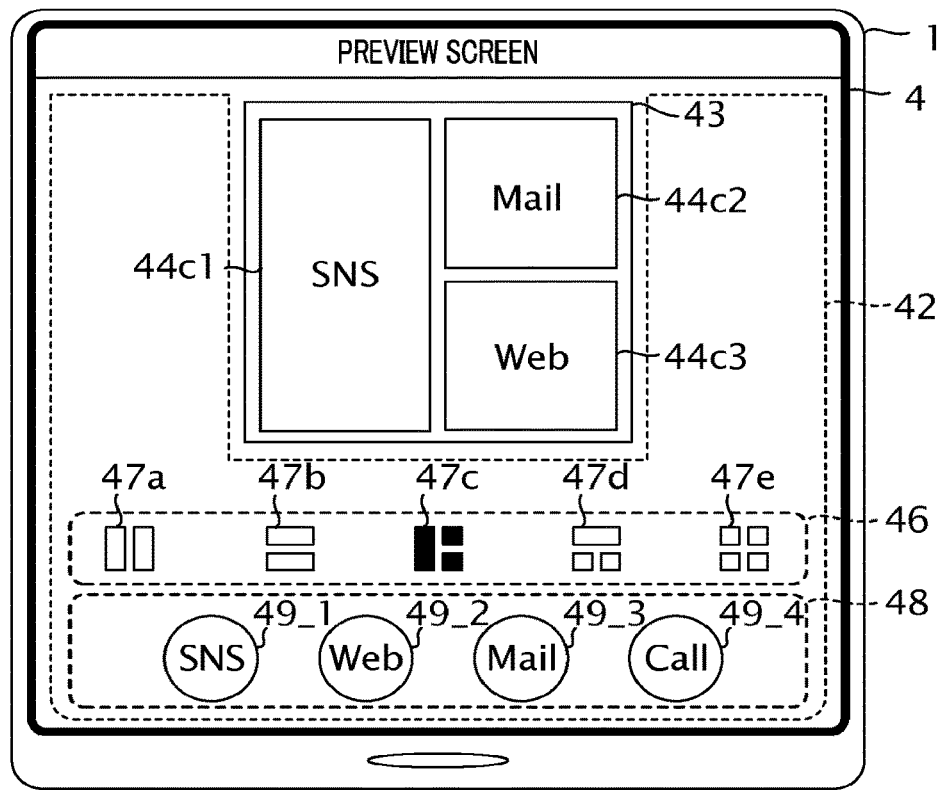
FIG. 10 is a diagram (part 1) illustrating a preview screen when the number of the split areas 44 is decreased.
Figure 11:
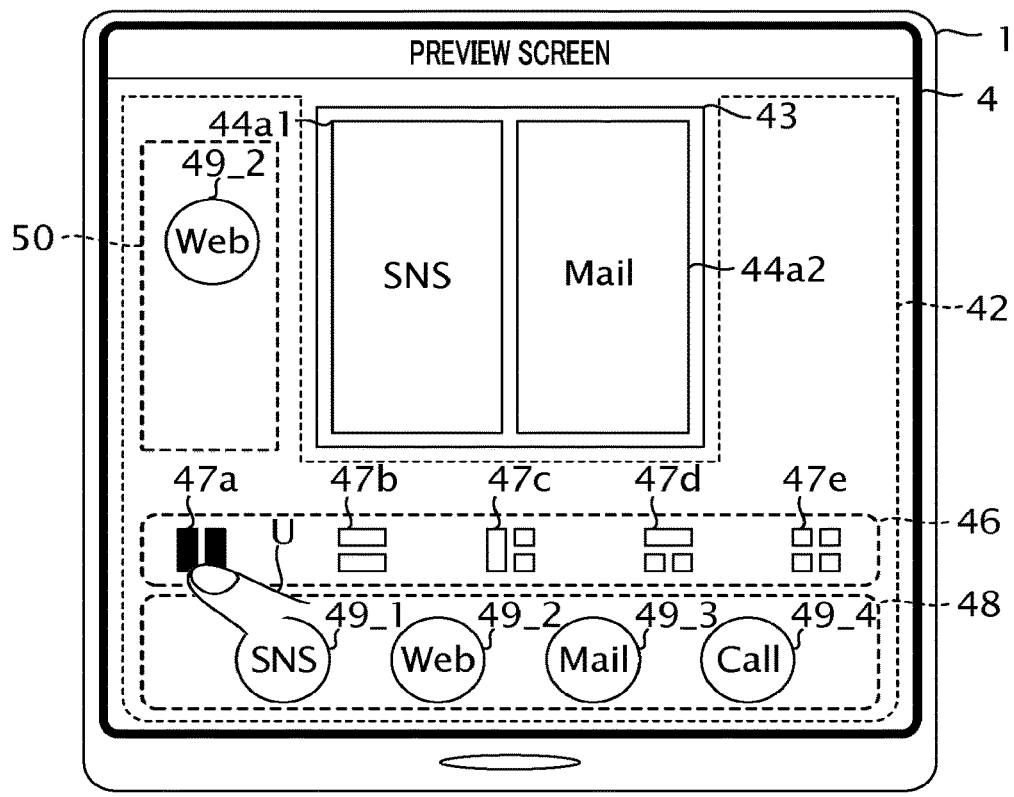
FIG. 11 is a diagram (part 2) illustrating a preview screen when the number of the split areas 44 is decreased.

FIGS. 10 and 11 are diagrams each illustrating a preview screen when the number of split areas 44 is decreased. The preview screen illustrated in FIG. 10 is an example of the layout A. In the preview screen illustrated in FIG. 10, the number of split areas 44 is three, and display images corresponding to an app are displayed in each of the three split areas 44. The preview screen illustrated in FIG. 11 is an example of the layout B, and the number of split areas 44 is two. Thus, the number of split areas 44 defined by the layout B is less than that defined by the layout A.

In one example illustrated in FIG. 10, the split icon 47c is tapped by the user U, a display image corresponding to an SNS app is displayed in the split area 44c1. A display image corresponding to an email app is displayed in the split area 44c2. A display image corresponding to a Web app is displayed in the split area 44c3.

In FIG. 11, when the split icon 47a is tapped by the user U, the split layout of the preview area 43 changes from the layout A into the layout B. Furthermore, the image updater 235 displays, in the split area 44a1, the display image corresponding to the SNS app, and it displays, in the split area 44a2, the display image corresponding to the email app. Therefore, the display image corresponding to the Web app is not displayed in the preview area 43 from among the display images that are displayed by the display controller 23 in the preview area 43 split by the first splitter 233 based on the layout A. The icon controller 231 displays, in the predetermined area 50 in the non-preview area 42, the Web app icon 49_2 corresponding to the display image, which corresponds to the Web app. In one example illustrated in FIG. 11, the predetermined area 50 is located on the left side of the preview area 43. The position of the predetermined area 50 is not limited to the example illustrated in FIG. 11, and it may be any position as long as it is within the non-preview area 42. However, the position of the predetermined area 50 is preferably a position easily operated by the user U.

A-2-1-3. A Case in which the Following Tap Operation is Received by the Receiver 21: Tapping a Certain Split Icon 47 Once, Tapping Another Split Icon 47, and then Tapping Again the Split Icon 47 that was Tapped First A case is assumed in which the split layout of the preview area 43 changes from the layout A into the layout B, thereafter does not change into another layout different from both the layout A and the layout B, and the first splitter 233 splits the preview area 43 based on the layout A. Furthermore, it is assumed that the number of splits of the layout A is less than that of the layout B. In these cases, the image updater 235 displays, in each of the split areas 44, the display images displayed in the preview area 43 in the layout A, which is immediately before the layout A was changed into the layout B.

When the following tap operation by the user U is received by the receiver 21: tapping a certain split icon 47 once, tapping another split icon 47, and then tapping again the split icon 47 that was tapped first, the layout A is an example of the "second layout", and the layout B is an example of the "first layout". The "case in which the split layout of the first area changes from the second layout into the first layout, and then the first splitter splits the first area into split areas based on the second layout" is an example of the following case: when the split layout of the preview area 43 changes from the layout A into the layout B, thereafter does not change into another layout different from both the layouts A and B, and the first splitter 233 splits the preview area 43 into the split areas 44 based on the layout A. The layout A that is immediately before the layout A is changed into the layout B is an example of "the second layout immediately before the second layout is changed into the first layout".

Here, an example will be given in which the layout of the preview area 43 has changed from the layout corresponding to the split icon 47c into the layout corresponding to the split icon 47a. Then, the first splitter 233 splits the preview area 43 based on the layout corresponding to the split icon 47c without changing into another layout different from (i) the layout corresponding to the split icon 47c and (ii) the layout corresponding to the split icon 47a. In this case, the image updater 235 displays, in each of the split areas 44, the display image each displayed in the layout corresponding to the split icon 47*c* that is immediately before the current layout is changed into the layout corresponding to the split icon 47*a*.

A-2-2. A Case in which a Drag and Drop Operation of an App Icon 49 to the Split Area 44 is Received by the Receiver 21

When a drag and drop operation of any one of the app icons 49 to one of the split areas 44 by the user is received by the receiver 21, the display image setting part 239 displays, in the split area 44 that is the drop destination, a display image corresponding to the dragged and dropped app icon 49. The drag and drop operation of the app icon 49 to the split area 44 by the user U corresponds to "operation of associating the second icon with any one of the split areas".

Figure 12:
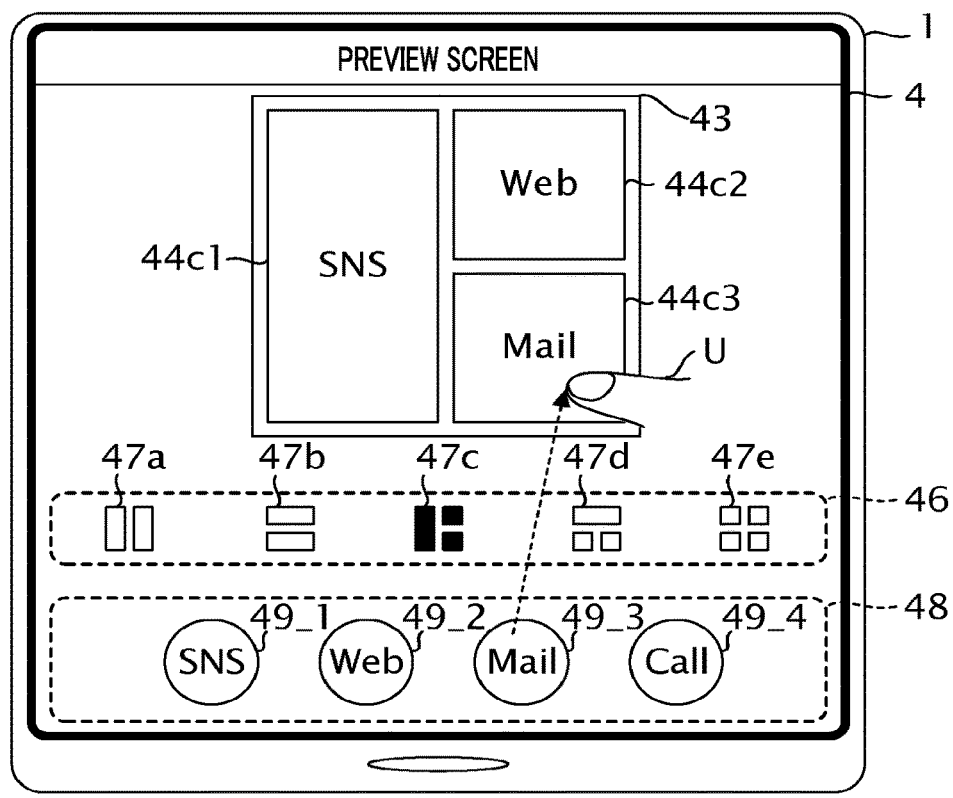
FIG. 12 is a view illustrating a preview screen when a drag and drop operation of an app icon 49 onto the split area 44 is received.

FIG. 12 is a view illustrating a preview screen when a drag and drop operation of an app icon 49 to the split area 44 by the user U is received. In FIG. 12, a state is shown after the split icon 47*c* is tapped. In one example illustrated in FIG. 12, the receiver 21 receives a drag and drop operation of the email app icon 49_3 to the split area 44*c*3. When this input operation is received by the receiver 21, the display image setting part 239 displays, in the split area 44*c*3, the display image corresponding to the email app.

A-2-3. A Case in which an Input Operation for Reducing the Size of the Split Area 44 is Received or a Double-Tap Operation to the Split Area 44 is Received When a predetermined input operation on any one of the split areas 44 is received by the receiver 21, the second splitter 237 splits the split area 44 into two split areas 44. One of the two split areas 44 is an example of a "first sub-split area". The other of the two split areas 44 is an example of a "second sub-split area". In the present embodiment, the predetermined input operation on the split area 44 includes reducing the split area 44 and double-tapping the split area 44. Hereinafter, description is given of the two cases: a case in which an input operation for reducing the size of the split area 44 is received, and a case in which a double-tap operation to the split area 44 is received.

A-2-3-1. A Case in which an Input Operation for Reducing the Size of the Split Area 44 is Received When an input operation for reducing the size of any one of the split areas 44 is received by the receiver 21, the second splitter 237 splits the split area 44 into two split areas 44. For example, the input operation for reducing the size of the split area 44 is defined by dragging a side along any one of the four sides of the preview area 43 from among the four sides of the split area 44, and dropping the dragged side inside the split area 44.

The second splitter 237 decides the size of each of the two split areas 44 on the basis of the drag and drop operation. More specifically, the second splitter 237 decides a rectangular area, as one split area 44 of the two split areas 44. This rectangular area has (i) a first side that is one of the four sides of the split area 44 and is dragged by a drag operation, and (ii) a second side that is a line segment, which is parallel to the side and passes through the position at which the drop operation is performed. Furthermore, the second splitter 237 decides, as the other split area 44 of the two split areas 44, an area of the split area 44 that does not overlap the one split area 44.

After the split area 44 is split into the two split areas 44, when a drag and drop operation of any one of the app icons 49 to one of the two split areas 44 by the user U is received by the receiver 21, the display image setting part 239 displays, in the split area 44 that is the drop destination of the app icon 49, a display image corresponding to the dragged and dropped app icon 49.

Figure 14:
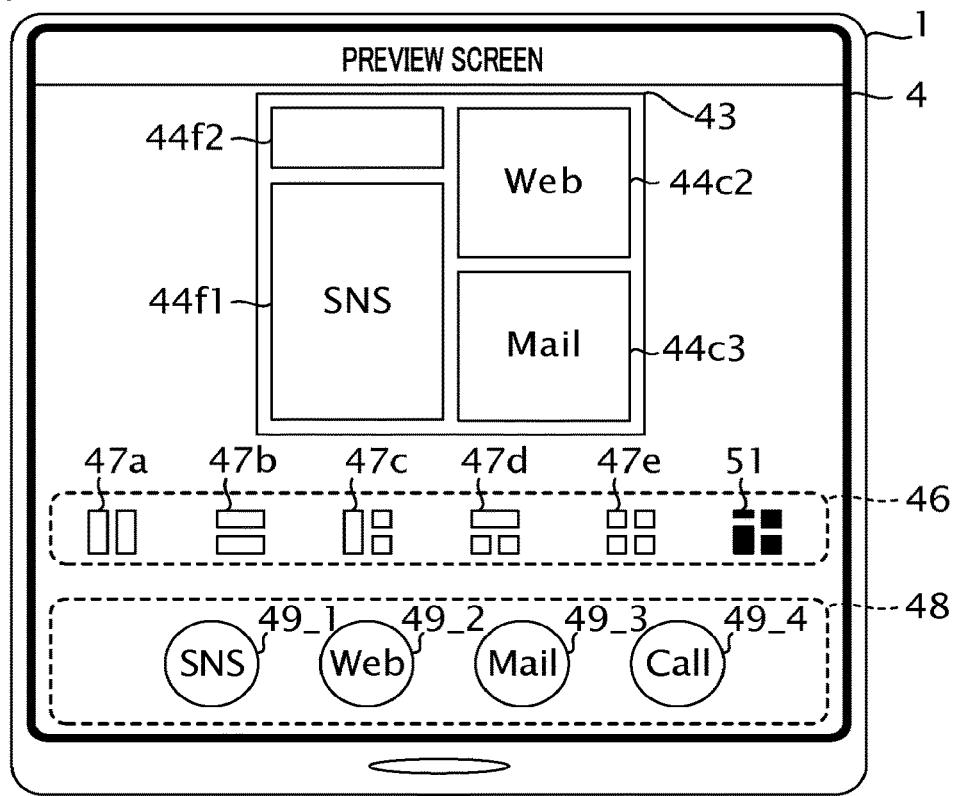
FIG. 14 is a diagram (part 2) illustrating a preview screen when an input operation for reducing the split area 44 is received by the receiver 21.

When the split area 44 is split into two split areas 44 by the second splitter 237, the icon controller 231 further displays, in the split icon area 46, the split icons 47 and a re-split icon 51 (FIG. 14). The re-split icon 51 is an example of a "third icon". The re-split icon 51 corresponds to a layout in which the preview area 43 is split into split areas 44 including two split areas 44 (the first sub-split area and the second sub-split area). However, the icon controller 231 does not display the re-split icon 51, when there is already the split icon 47 corresponding to the layout, in which the preview area 43 is split into the split areas 44 including the two split areas 44 from among the split icons 47.

Figure 13:
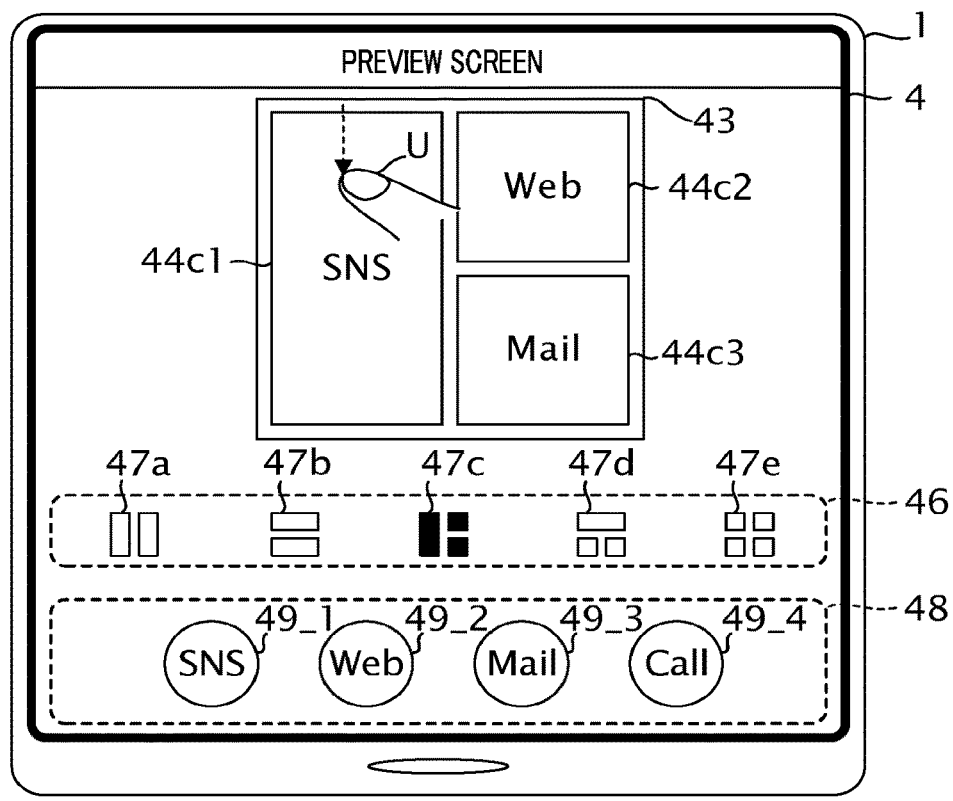
FIG. 13 is a diagram (part 1) illustrating a preview screen when an input operation for reducing the split area 44 is received by a receiver 21.

FIGS. 13 and 14 are diagrams each illustrating a preview screen when an input operation for reducing the size of the split area 44 is received by the receiver 21. In FIG. 13, a state is shown after the split icon 47*c* is tapped. In one example illustrated in FIG. 13, the upper side of the split area 44*c*1 is dragged and dropped toward the inside of the split area 44 by the user U.

In FIG. 14, a drag and drop operation, by the user U, of the upper side of the split area 44*c*1 toward the inside of the split area 44 is received by the receiver 21, as a result, the second splitter 237 splits the split area 44*c*1 into a split area 44*f*1 (an example of the "first sub-split area") and a split area 44*f*2 (an example of the "second sub-split area") on the basis of the drag and drop operation. Furthermore, the icon controller 231 displays, in the split icon area 46, the re-split icon 51 corresponding to the split areas 44 including the split area 44*f*1 and the split area 44*f*2.

A-2-3-2. A Case in which a Double-Tap Operation to the Split Area 44 is Received by the Receiver 21

When a double-tap operation to any one of the split areas 44 is received by the receiver 21, the second splitter 237 also splits one split area 44 into two split areas 44. The double tap operation to the split area 44 by the user U is an example of the "predetermined operation on the split area".

The second splitter 237 decides the size of each of the two split areas 44 on the basis of the operation of the user U double-tapping. More specifically, the second splitter 237 decides a rectangular area, as one split area 44 of the two split areas 44. This rectangular area has (i) a first side that is one of the two sides in the lateral direction of the one split area 44 and is along any one of the four sides of the preview area 43, and (ii) a second side that is a line segment, which is parallel to the first side and passes through the double-tapped position. Furthermore, the second splitter 237 decides, as the other split area 44 of the two split areas 44, an area of one of the split areas 44 that does not overlap the one split area 44.

After the one split area 44 is split into the two split areas 44, when a drag and drop operation of any one of the app icons 49 into one of the two split areas 44 by the user U is received by the receiver 21, the display image setting part 239 displays, in the split area 44 at which the app icon 49 has been dropped, a display image corresponding to the dragged and dropped app icon 49.

When the one split area 44 is split into the two split areas 44 by the second splitter 237, the icon controller 231 further displays, in the split icon area 46, the split icons 47 and the re-split icon 51. However, the icon controller 231 does not display the re-split icon 51, when there is already the split icon 47 corresponding to the layout, in which the preview area 43 is split into the split areas 44 including the two split areas 44 from among the split icons 47. This is similar in manner to the case in which of the input operation of reducing the split area 44 is received.

Figure 15:
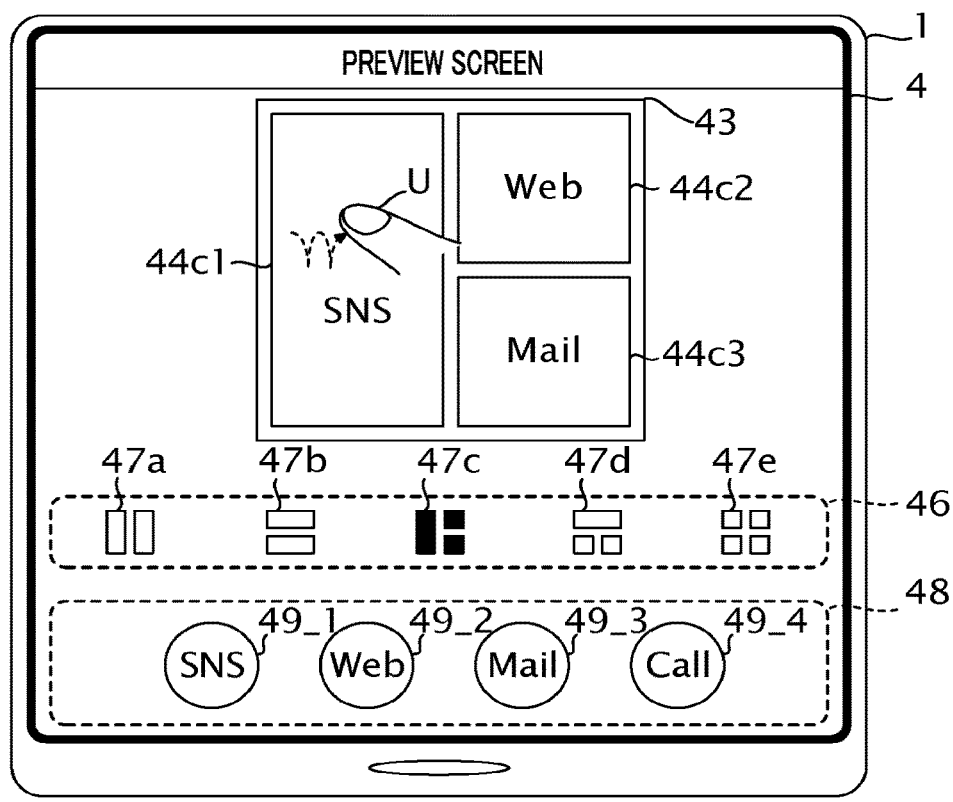
FIG. 15 is a diagram (part 1) illustrating a preview screen when a double-tap operation to the split area 44 is received by the receiver 21.
Figure 16:
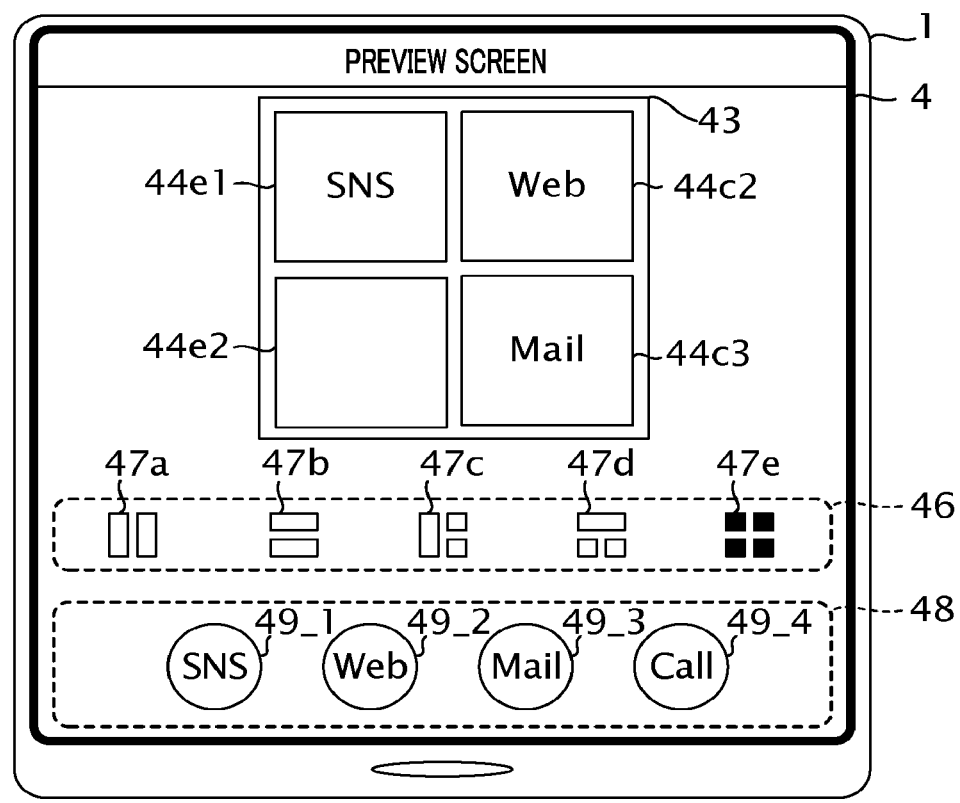
FIG. 16 is a diagram (part 2) illustrating a preview screen when a double-tap operation to the split area 44 is received by the receiver 21.

FIGS. 15 and 16 are diagrams each illustrating a preview screen when a double-tap operation to the split area 44 by the user U is received by the receiver 21. In FIG. 15, a state is shown after the split icon 47*c* is tapped. In one example illustrated in FIG. 15, near the center of the split area 44*c*1 is being double-tapped by the user U.

On the preview screen illustrated in FIG. 15, the receiver 21 receives a double-tap operation to the split area 44*c*1 by the user U. The second splitter 237 splits the preview area 43 into a split area 44*e*1 and a split area 44*e*2 on the basis of the double-tap operation. In one example illustrated in FIG. 16, the icon controller 231 does not display the re-split icon 51 because there is already the split icon 47*e* corresponding to the layout of splitting the preview area 43 into the split area 44*e*1 (an example of the "first sub-split area"), the split area 44*e*2 (an example of the "second sub-split area"), the split area 44*c*2, and the split area 44*c*3.

A-3. Procedures of Information Processing Apparatus 1

The procedures of the information processing apparatus 1 will be described with reference to FIGS. 17A to 20B.

Figure 17A:
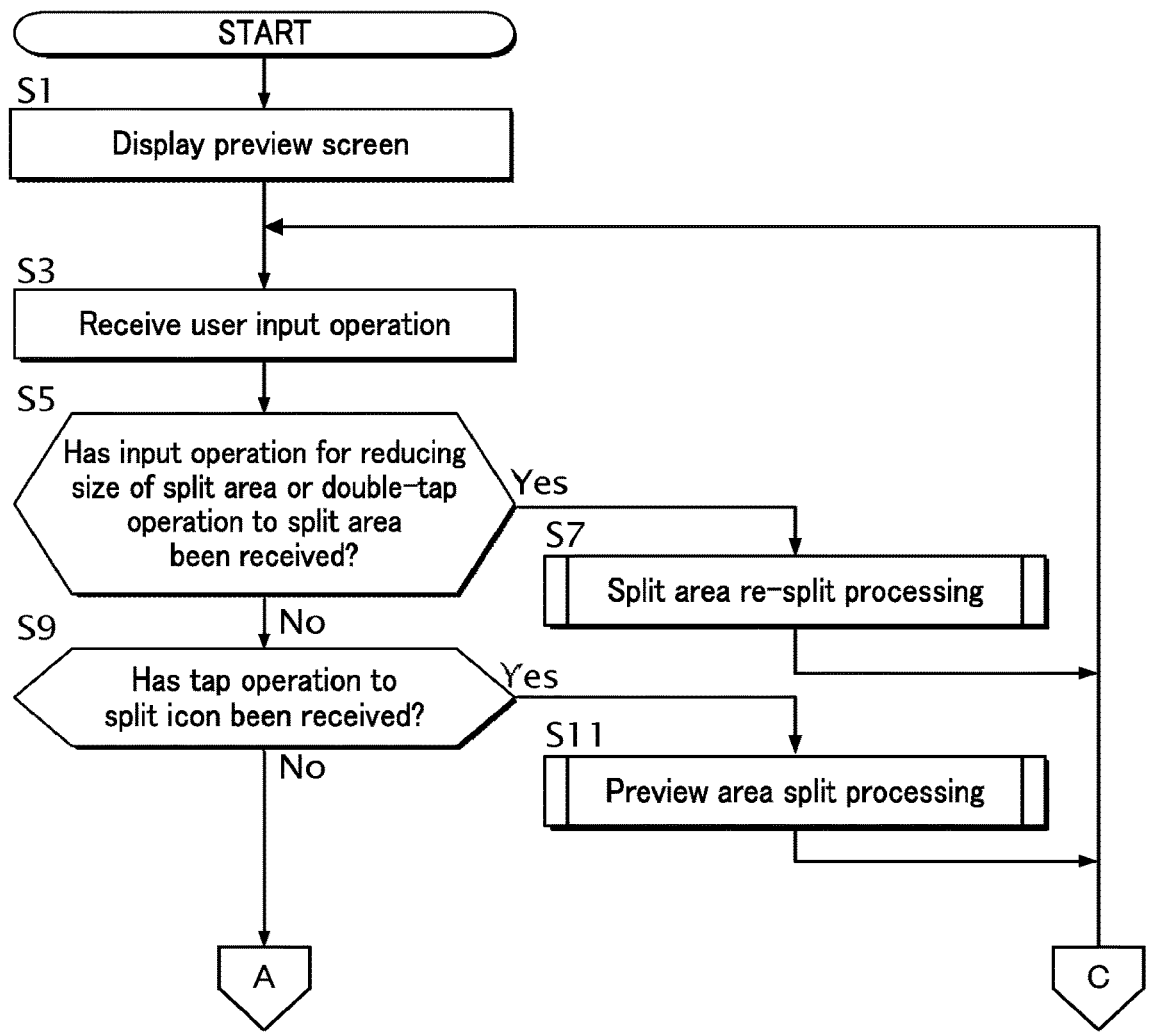
FIG. 17A is a flowchart (part 1) illustrating preview screen processing.
Figure 17B:
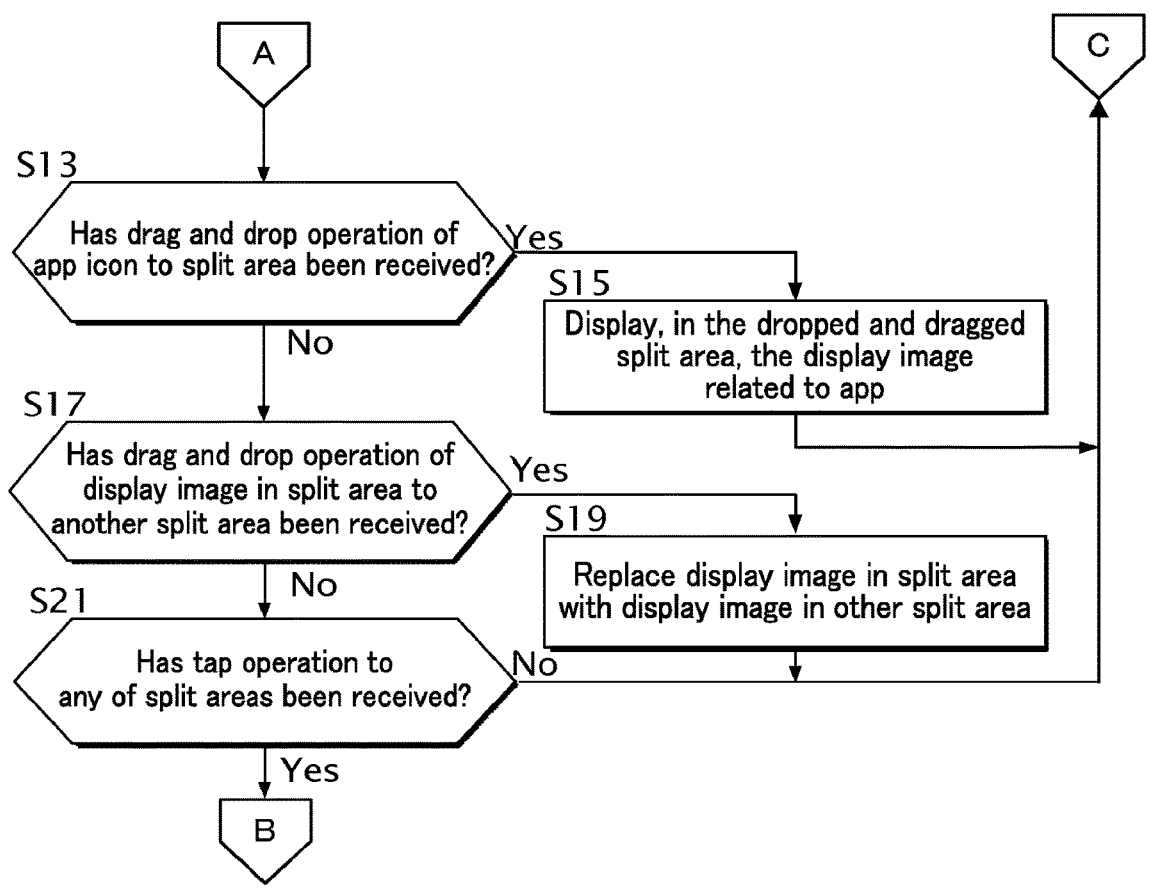
FIG. 17B is a flowchart (part 2) illustrating preview screen processing.
Figure 18:
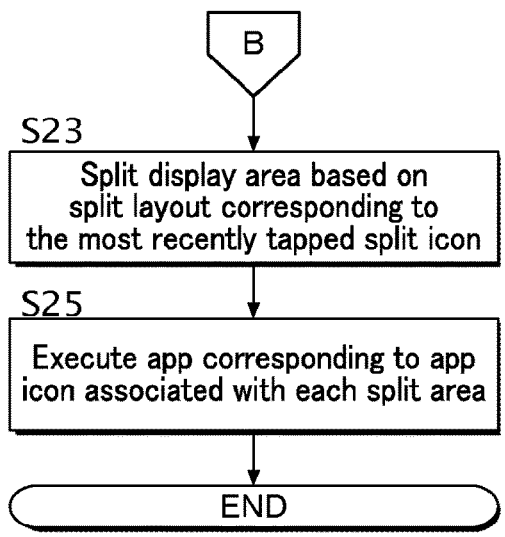
FIG. 18 is a flowchart (part 3) illustrating preview screen processing.

FIGS. 17A, 17B, and 18 are flowcharts each illustrating preview screen processing. The preview screen processing is executed, when a display request for the preview screen is received by the user U's input operation. For example, when the input operation corresponding to the display request of the preview screen is received in a state in which the touch panel 4 displays the home screen, the information processing apparatus 1 executes the preview screen processing.

Figure 21:
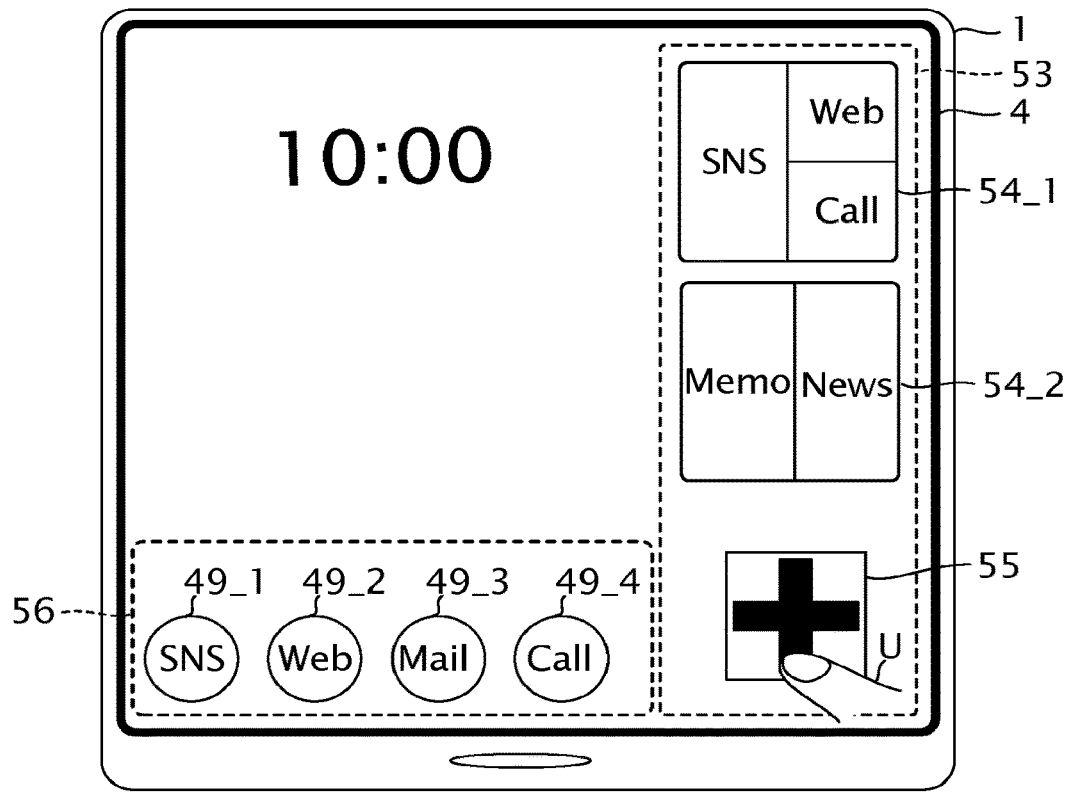
FIG. 21 is a diagram illustrating an example in which an input operation corresponding to a display request of a preview screen is received.

FIG. 21 is a diagram illustrating an example in which an input operation corresponding to the display request of the preview screen is received. In the state illustrated in FIG. 21, the home screen is displayed in the display area 40 on the touch panel 4. The home screen has a launcher icon area 53 and an app icon area 56. The launcher icon area 53 is an area that is used to arrange one or more launcher icons 54 and a preview screen display button 55. The launcher icon 54 is used to execute one or more apps in response to a tap operation by the user U. The launcher icon 54 indicates one or more apps to be activated and a split layout of the display area 40. When the launcher icon 54 is tapped, the touch panel 4 displays a display image corresponding to each of one or more apps indicated by the launcher icon 54 in accordance with a split layout indicated by the launcher icon 54.

The preview screen display button 55 is a button that is used to display a preview screen by being tapped by the user U. In the app icon area 56, one or more of app icons 49 are arranged.

In one example illustrated in FIG. 21, the launcher icon area 53 includes a launcher icon 54_1, a launcher icon 54_2, and the preview screen display button 55. The launcher icon 54_1 is used to execute the SNS app, the Web app, and the phone app. The launcher icon 54_1 shows that the display area 40 is split into a left split display area 41, an upper right split display area 41, and a lower right split display area 41. Furthermore, the launcher icon 54_1 shows that (i) the display image corresponding to the SNS app is displayed in the left split display area 41, (ii) the display image corresponding to the Web app is displayed in the upper right split display area 41, and (iii) the display image corresponding to the phone app is displayed in the lower right split display area 41. The launcher icon 54_2 is used to execute a note app and a news app. The launcher icon 54_2 shows that the display area 40 is split into a left split display area 41 and a right split display area 41. Furthermore, the launcher icon 54_2 shows that (i) the display image corresponding to the note app is displayed in the left split display area 41, and (ii) the display image corresponding to the news app is displayed in the right split display area 41.

The preview screen display button 55 is tapped by the user U to split the display area 40 based on a split layout different from that indicated by any launcher icon 54 from among the one or more launcher icons 54. For example, the preview screen display button 55 may be tapped by the user to cause the following (i) or (ii) to be executed by the information processing apparatus 1: (i) an app having a combination different from any of the combinations of the one or more apps indicated by each of the launcher icons 54, or (ii) one or more apps indicated by any of the one or more launcher icons 54. In one example illustrated in FIG. 21, the preview screen display button 55 may be tapped by the user U, when the combination of the apps that the user U desires to cause the information processing apparatus 1 to execute is different from the following (i) and (ii): (i) the combination of the SNS app, the Web app, and the phone app indicated by the launcher icon 54_1, and (ii) the combination of the note app and the news app indicated by the launcher icon 54_2. Alternatively, the preview screen display button 55 may be tapped by the user U, even when the combination of the apps, which is desired by the user U to be executed by the information processing apparatus 1, is a combination of the SNS app, the Web app, and the phone app if the user U desires to split the display area 40 in a split layout different from the split layout indicated by the launcher icon 54_1. Alternatively, even when the combination of the apps, which is desired by the user U to be executed by the information processing apparatus 1, is a combination of the note app and the news app, if the user U desires to split the display area 40 in a split layout different from the split layout indicated by the launcher icon 54_2, the user U taps the preview screen display button 55.

When the display request for the preview screen is received in response to the tap operation to the preview screen display button 55, the processor 2 causes the touch panel 4 to display the preview screen (step S1). Next, the processor 2 receives an input operation of the user U (step S3). The processor 2 determines whether an input operation for reducing the size of the split area 44 or a double-tap operation to the split area 44 has been received (step S5). When the determination result at step S5 is "Yes", the processor 2 executes split area re-split processing (step S7).

Figure 19:
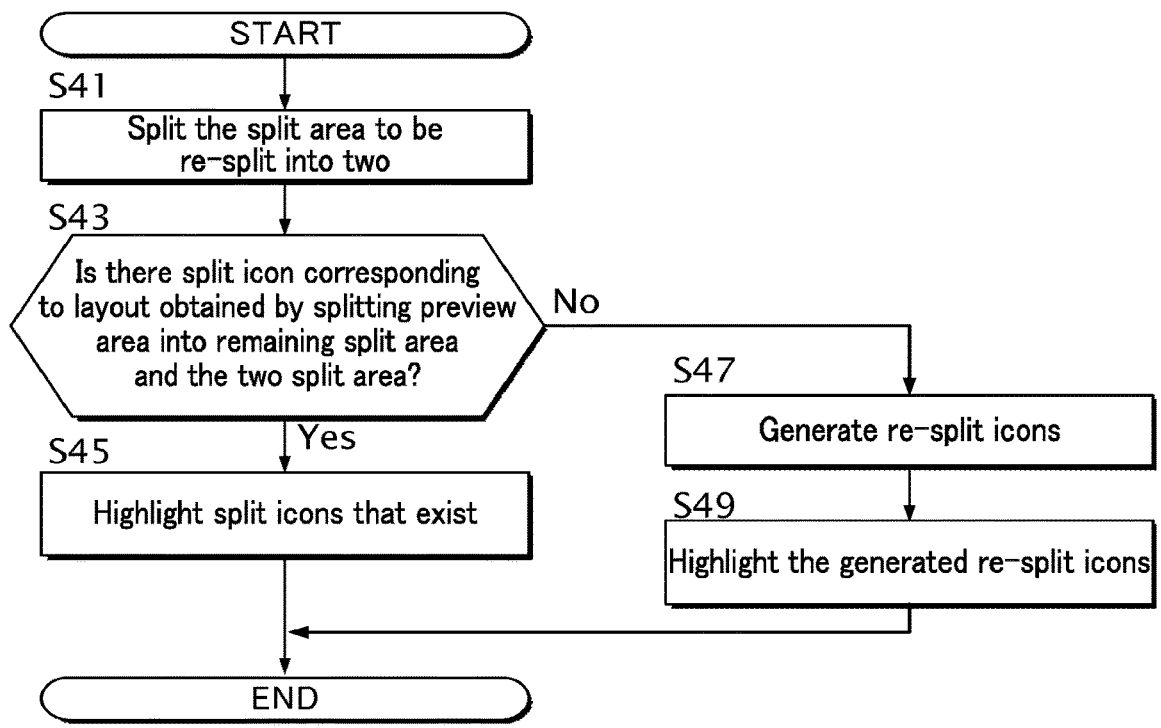
FIG. 19 is a flowchart illustrating split area re-split processing.

FIG. 19 is a flowchart illustrating the split area re-split processing. By the split area re-split processing, a split area 44 in which its size is to be reduced or a split area 44 to be double-tapped is further split. The split area 44 in which its size is to be reduced or the split area 44 to be double-tapped is referred to as "split area 44 to be re-split".

The processor 2 splits the split area 44 to be re-split into two split areas 44 (step S41). Step S41 corresponds to the processing of the second splitter 237. Next, the processor 2 determines whether the following split icon 47 exists (step S43): The preview area 43 is split into the two split areas 44 and the remaining split areas 44. The remaining split areas 44 are other than the split area 44 to be re-split from among the split areas 44 that are split based on the layout corresponding to the currently selected split icon 47. The split icon 47 to be determined corresponds to a layout obtained by splitting the preview area 43 into the two split areas 44 and the remaining split areas 44. When the determination result at step S43 is "Yes", the processor 2 highlights the split icon 47 corresponding to the layout in which the preview area 43 is split (step S45). Furthermore, the processor 2 registers a split icon ID indicating the existing split icon 47 in the association information RI. After completion of step S45, the processor 2 completes the series of steps illustrated in FIG. 19, and returns the processing to step S3.

When the determination result at step S43 is "No", the processor 2 generates the re-split icon 51 (step S47). More specifically, the processor 2 generates a record SPIR corresponding to the re-split icon 51, and registers the generated record SPIR in the split icon information SPI. The re-split icon 51 corresponds to a layout in which the preview area 43 is split into the remaining split areas 44 other than the split area 44 to be re-split and the two split areas 44.

After step S47, the processor 2 causes the generated re-split icon 51 to be displayed (highlighted in the present embodiment) (step S49). Furthermore, the processor 2 registers a split icon TD indicating the re-split icon 51 in the association information RI. Steps S47 and S49 correspond to the processing of the icon controller 231. After step S49, the processor 2 completes the series of steps illustrated in FIG. 19, and returns the processing to step S3.

The description returns to FIG. 17A. When the determination result at step S5 is "No", the processor 2 determines whether a tap operation to the split icon 47 by the user U has been received (step S9). When the determination result at step S9 is "Yes", the processor 2 executes preview area split processing (step S11).

Figure 20A:
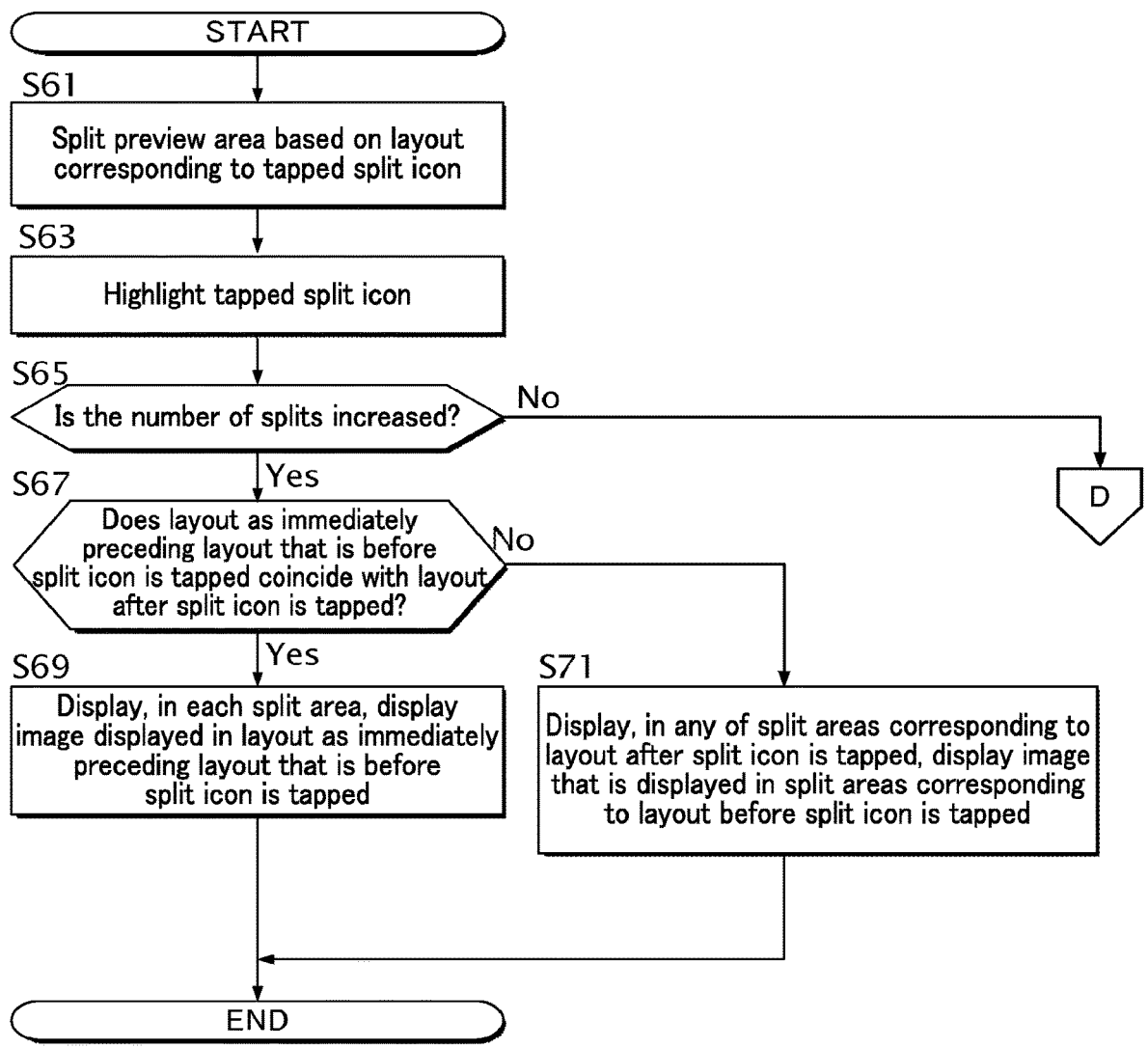
FIG. 20A is a flowchart (part 1) illustrating preview area split processing.
Figure 20B:
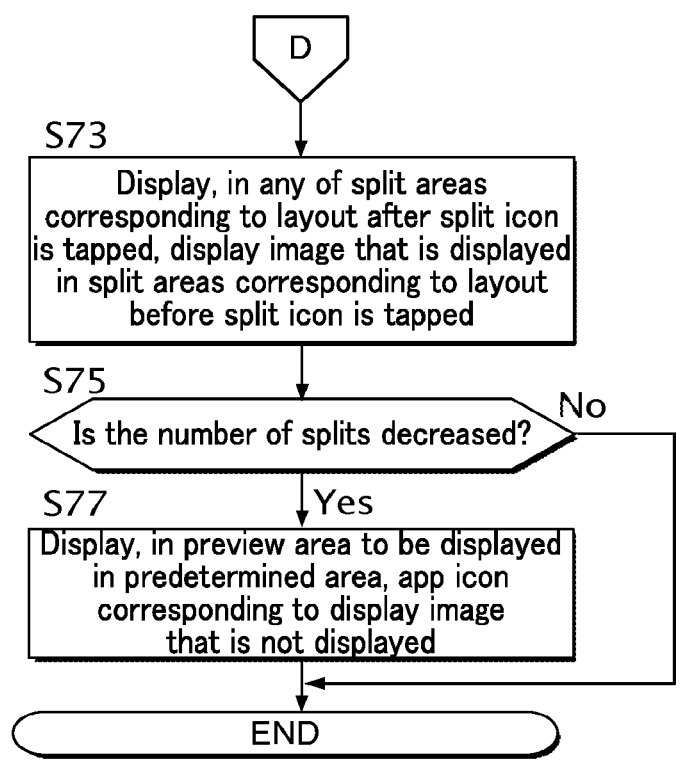
FIG. 20B is a flowchart (part 2) illustrating preview area split processing.

FIGS. 20A and 20B are flowcharts each illustrating the preview area split processing. By the preview area split processing, the preview area 43 is split based on the split icon 47 tapped by the user U. The processor 2 splits the preview area 43 based on a layout corresponding to the tapped split icon 47 (step S61). Step S61 corresponds to the processing of the first splitter 233. Next, the processor 2 causes the tapped split icon 47 to be highlighted (step S63). Furthermore, the processor 2 registers a split icon ID indicating the tapped split icon 47 in the association information RI.

After step S63, the processor 2 determines whether the number of splits in the layout after the split icon 47 is tapped is increased as compared with that in the layout before the split icon 47 was tapped (step S65).

When the determination result at step S65 is "Yes", the processor 2 determines whether the layout as the immediately preceding layout that was before the split icon 47 is tapped coincides with the layout after the split icon 47 is tapped (step S67). When the determination result at step S67 is "Yes", the processor 2 displays, in each of the split areas 44, the display image displayed in the layout as the immediately preceding layout that was before the split icon 47 is tapped (step S69). Furthermore, the processor 2 associates, with each of the split area IDs of the association information RI, the ID of the app icon 49 corresponding to the display image displayed based on the layout as the immediately preceding layout before the split icon 47 was tapped. Step S69 corresponds to the processing of the image updater 235. After step S69, the processor 2 completes the series of steps illustrated in FIGS. 20A and 20B, and returns the processing to step S3.

When the determination result at step S67 is "No", the processor 2 displays, in any one of the split areas 44 corresponding to the layout after the split icon 47 is tapped, the display image that is displayed in the split areas 44 corresponding to the layout before the split icon 47 was tapped (step S71). Step S71 corresponds to the processing of the image updater 235. Furthermore, the processor 2 associates, with each of the split area IDs of the association information RI, the ID of the app icon 49 corresponding to the display image that is displayed in the split area 44 indicated by each split area ID. After step S71, the processor 2 completes the series of steps illustrated in FIGS. 20A and 20B, and returns the processing to step S3.

When the determination result at step S65 is "No", the processor 2 displays, in any one of the split areas 44 corresponding to the layout after the split icon 47 was tapped, the display image that is displayed in the split areas 44 corresponding to the layout before the split icon 47 was tapped (step S73). Furthermore, the processor 2 associates, with each of the split area IDs of the association information RI, the ID of the app icon 49 corresponding to the display image that is displayed in the split area 44 indicated by each split area ID. The phrase "when the determination result at step S65 is No" corresponds to the following cases (i) and (ii): (i) a case in which the number of splits of the layout before the split icon 47 was tapped coincide with the number of splits of the layout after the split icon 47 was tapped, and (ii) a case in which the number of splits of the layout before the split icon 47 was tapped is decreased.

After step S73, the processor 2 determines whether the number of splits in the layout after the split icon 47 was tapped decreased compared with the number of splits in the layout before the split icon 47 was tapped (step S75).

When the determination result at step S75 is "Yes", the processor 2 displays, in the preview area 43 to be displayed in the predetermined area 50, the app icon 49 corresponding to the display image that is not displayed (step S77). Step S77 corresponds to the processing of the icon controller 231. After step S77, the processor 2 completes the series of steps illustrated in FIGS. 20A and 20B, and returns the processing to step S3.

When the determination result at step S75 is "No", the processor 2 completes the series of steps illustrated in FIGS. 20A and 20B, and returns the processing to step S3. The phrase "when the determination result at step S75 is No" corresponds to a case in which the number of splits of the layout before the split icon 47 was tapped coincides with the number of splits of the layout after the split icon 47 was tapped.

When the determination result at step S9 is "No" in FIG. 17A, the processor 2 determines whether a drag and drop operation of the app icon 49 to the split area 44 by the user U has been received (FIG. 17B; step S13). When the determination result at step S13 is "Yes", the processor 2 displays, in the split area 44 that is the drop destination, the display image corresponding to the app icon 49 (step S15). Furthermore, the processor 2 associates the ID indicating the dragged and dropped app icon 49 with the split area ID indicating the dragged and dropped split area 44 of the association information RI. Step S15 corresponds to the processing of the display image setting part 239. After step S15, the processor 2 returns the processing to step S3.

When the determination result at step S13 is "No", the processor 2 determines whether a drag and drop operation of the display image in the split area 44 to another split area 44 by the user U has been received (step S17). When the determination result at step S17 is "Yes", the processor 2 replaces the display image in the split area with the display image in the other split area (step S19). Furthermore, in the association information RI, the processor 2 mutually replaces the IDs of the app icons 49 associated with the split area IDs indicating the two split areas 44 to be exchanged. After step S19, the processor 2 returns the processing to step S3.

Figure 22:
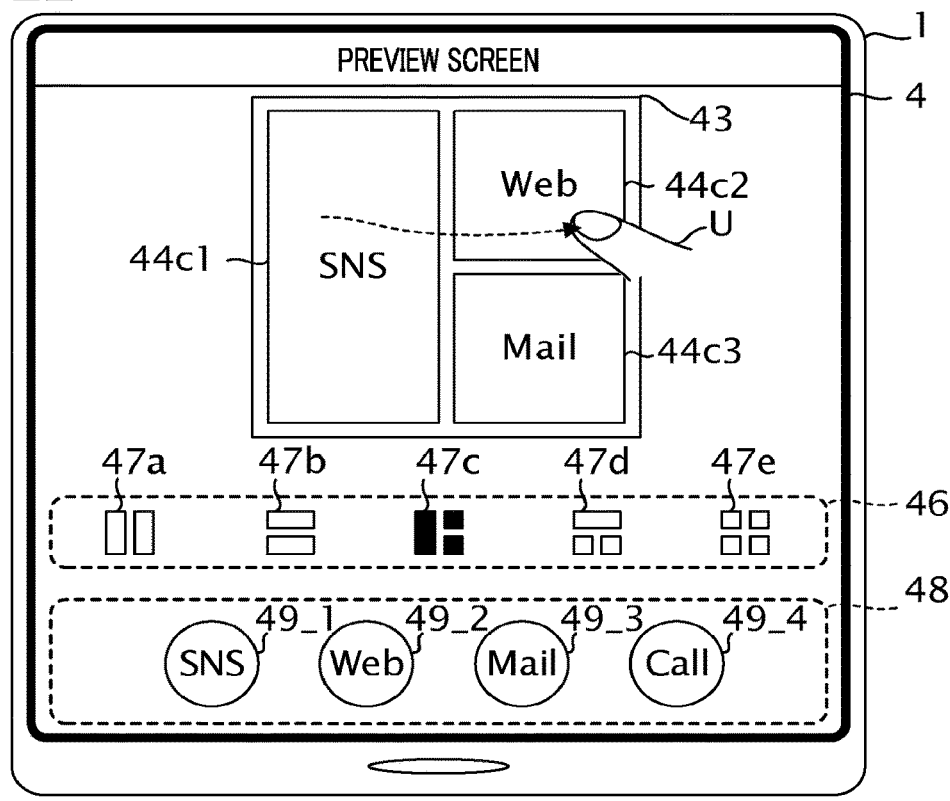
FIG. 22 is a diagram (part 1) illustrating a preview screen when a drag and drop operation of a display image in the split area 44 onto another split area 44 is received by the receiver 21.
Figure 23:
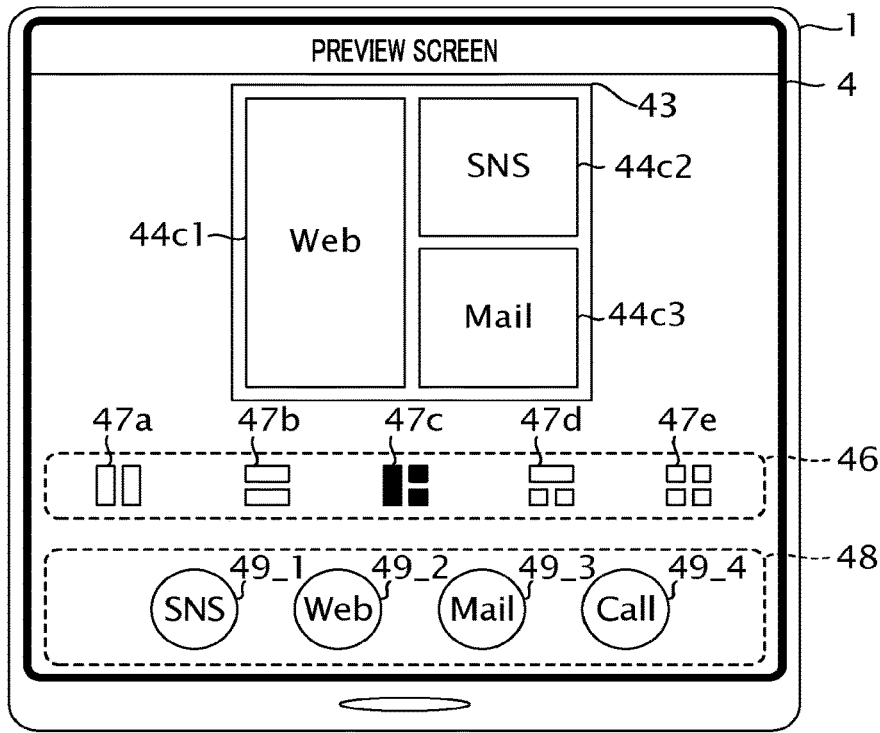
FIG. 23 is a diagram (part 2) illustrating a preview screen when a drag and drop operation of a display image in the split area 44 onto another split area 44 is received by the receiver 21.

FIGS. 22 and 23 are diagrams each illustrating a preview screen when a drag and drop operation of a display image in the split area 44 to the other split area 44 by the user U is received by the receiver 21. In FIG. 22, a state is shown after the split icon 47c was tapped. In one example illustrated in FIG. 22, the display image corresponding to the SNS app in the split area 44c1 is dragged and dropped to the split area 44c2 by the user U.

In FIG. 23, the processor 2 displays, in the split area 44c2, the display image corresponding to the SNS app. The processor 2 then displays, in the split area 44c1, the display image corresponding to the Web app displayed in the split area 44c2.

In FIG. 17B, when the determination result at step S17 is "No", the processor 2 determines whether a tap operation for any one of the split areas 44 by the user U has been received (step S21).

When the determination result at step S21 is "Yes", the processor 2 splits the display area 40 based on the split layout corresponding to the most recently tapped split icon 47 (FIG. 18; step S23). More specifically, the processor 2 stops the preview screen from being displayed. Then, the processor 2 refers to the association information RI and identifies the most recently tapped split icon 47. The processor 2 refers to the split icon information SPI, and displays the split display areas 41 obtained by splitting the display area 40 based on the split layout corresponding to the identified split icon 47.

After step S23, the processor 2 executes an app corresponding to the app icon 49 associated with each split area 44 (step S25). More specifically, the processor 2 identifies the app icon 49 associated with each split area 44 with reference to the association information RI. Next, the processor 2 refers to the app icon information ICI, and executes the app using the identified app execution character string of the app icon 49. After step S25, the processor 2 completes the series of steps illustrated in FIGS. 17A, 17B, and 18.

A-4. Effects of Embodiment

As described above, according to the embodiment, the information processing apparatus 1 includes a receiver 21 that receives an input operation of the user U, and the display controller 23 that displays an image in the display area 40 including the preview area 43 (an example of the "first area") and the non-preview area 42 (an example of the "second area"). The display controller 23 includes an icon controller 231 and a first splitter 233. The icon controller 231 display, in the split icon area 46 (an example of "second area"), split icons 47 (an example of the "first icons") associated one-to-one with a different layouts for splitting the preview area 43. When the receiver 21 receives a tap operation for any one of the split icons 47 (an example of "an operation for selecting any one of first icons"), the first splitter 233 splits the preview area 43 into split areas 44 based on a split layout corresponding to the tapped split icon 47.

Since one split icon 47 corresponds to only one layout in splitting the preview area 43, the layout in which only one split icon 47 is displayed in the split icon area 46 cannot correspond to various split layouts in splitting the preview area 43. However, according to the present embodiment, since the split icons 47 are displayed in the split icon area 46, it is possible to correspond to layouts in splitting the preview area 43.

According to the present embodiment, it is possible to reduce the burden on the user U in splitting the display area 40 as compared with a case in which only one split icon 47 is displayed in the split icon area 46. When only one split icon 47 is displayed in the split icon area 46, after tapping one split icon 47, the user U needs to adjust the positions and sizes of the of split areas 44 split based on the split layout corresponding to one split icon 47 as desired by the user U. However, in the present embodiment, the user U does not need to adjust the positions and sizes of the split areas 44, because the user U only needs to tap the split icon 47 from among the split icons 47, based on the split layout desired by the user U. Therefore, it is possible to reduce the burden on the user U in splitting the display area 40.

The icon controller 231 further displays, in the non-preview area 42, the app icons 49 (an example of the "second icon"). Some of the app icons 49 are associated one-to-one with the display images. The display controller 23 further includes the display image setting part 239. When the receiver 21 receives a drag and drop operation of any one of the app icons 49 for any one of the split areas 44 (an example of an "associating operation"), the display image setting part 239 displays, in the split area 44 that is the drop destination, a display image corresponding to the dragged and dropped app icon 49.

According to the present embodiment, since the display image corresponding to the app icon 49 is displayed in each of the split areas 44 on the preview screen, the user U can previously confirm the image to be displayed in the split display area 40. In the present embodiment, the user U can decide, within one preview screen, a split layout of the display area 40 and an app to be displayed in each of the split display areas 40 when the display area 41 is split. As a result, the present embodiment can reduce the burden on the user U in splitting the display area 40, as compared with a configuration that decides the split layout of the display area 40 on one screen and decides, on another screen, the apps to be displayed in each split display area 41 when the display area 40 is split.

The display controller 23 further includes the second splitter 237. When the receiver 21 receives an input operation for reducing the size of any one of the split areas 44 (an example of a "predetermined input operation on any one of the split areas"), the second splitter 237 splits the one split area 44 into two split areas (an example of the "first sub-split area and the second sub-split area"). When the receiver 21 receives a drag and drop operation for any one of the app icons 49 for one of the two split areas 44 (an example of an "associating operation"), the display image setting part 239 displays, in the split area 44 that is the drop destination of the app icon 49, a display image corresponding to the dragged and dropped app icon 49. In addition, when a double-tap operation to one split area 44 is received, the second splitter 237 splits one split area 44 into two split areas 44.

According to the present embodiment, since the split area 44 is further split by the input operation of the user U, various split layouts can be carried out using existing split layouts. Therefore, the burden on the user U in splitting the display area 40 can be reduced as compared with a case in which the user U creates a new split layout.

When one split area 44 is further split into two split areas 44 by the second splitter 237, the icon controller 231 displays, in the non-preview area 42, the split icons 47 and the re-split icon 51 (an example of the "third icon"). The re-split icon 51 corresponds to a layout in which the preview area 43 is split into split areas 44 including two split areas 44. According to the present embodiment, by tapping the re-split icon 51, the user U can use a split layout that does not exist in any of the split layouts corresponding to each split icon 47.

Layouts of splitting the preview area 43 include a first layout and a second layout that is different from the first layout. The number of the split areas 44 defined by the first layout is less than that of split areas 44 defined by the second layout. The display controller 23 further includes the image updater 235. When the display image is displayed in each of the split areas 44 defined by the first layout, and when the preview area 43 is split into the split areas 44 corresponding to the second layout by the first splitter 233, the image updater 235 displays, in any one of the plurality of split areas 44 corresponding to the second layout, each display image displayed in the split areas 44 corresponding to the first layout.

Each display image displayed in the split areas 44 corresponding to the first layout corresponds to the app icon 49 dragged and dropped by the user U into the split area 44. In the second layout, there is a high probability that the user U will desire to execute an app corresponding to each display image displayed in the split areas 44 corresponding to the first layout. Thus each display image, which is displayed in the split areas 44 corresponding to the first layout, is displayed in any one of the split areas 44 corresponding to the second layout, and thereby the processor 2 can execute the app desired by the user U.

When the split layout of the preview area 43 changes from the second layout into the first layout, and thereafter does not change into another layout different from both of the first layout and the second layout, when the first splitter 233 splits the preview area 43 into the split areas 44 based on the second layout (an example of in a "when the split layout of the first area changes from the second layout into the first layout, and then the first splitter splits the first area into split areas based on the second layout"), the image updater 235 displays, in each of the split areas 44, the display image that is displayed in the second layout immediately before the second layout is changed into the first layout (an example of "the second layout immediately before the second layout is changed into the first layout").

The number of the split areas 44 defined by the first layout is less than that defined by the second layout, from among the display images that are displayed in each of the split areas 44 based on the second layout of the first time, there is one or more display images that are not displayed in the preview area 43 split by the first splitter 233 based on the first layout. The app icon 49 corresponding to the display image is dragged and dropped by the user U to the split area 44. Therefore, there is a high probability that the user U will desire to execute the app corresponding to this app icon 49. When the preview area 43 is split into the split areas 44 based on the second layout of the second time, the display image that is displayed in the second layout of the first time (the last one) is displayed in each of the split areas 44, and thereby the processor 2 can execute the app desired by the user U.

When the split layout of the preview area 43 changes from the second layout into the first layout, from among the display images caused to be displayed by the display controller 23 in the first area split by the first splitter 233 based on the second layout, the icon controller 231 displays, in the predetermined area 50 (an example of the "second area"), one or more app icons 49 corresponding, one-to-one, with one or more display images that are not displayed in the first area split by the first splitter 233 based on the first layout.

As described above, from among the display images displayed in each of the split areas 44 based on the second layout, there are one or more display images that are not displayed in the preview area 43 split by the first splitter 233 based on the first layout. There is a case in which the user U desires this display image to be displayed in the split area 44 more preferentially than that in the preview area 43 split by the first splitter 233 based on the first layout. Thus, the icon controller 231 displays, in the predetermined area 50, the app icons 49 corresponding to one or more display images that are not displayed in the preview area 43. As the user U drags and drops the app icon 49 displayed in the predetermined area 50 to the split areas 44, the processor 2 displays, in the split area 44, a display image corresponding to the app icon 49 that is displayed in the predetermined area 50.

The app icons 49 corresponding to one or more display images not displayed in the preview area 43 exist in the app icon area 48. However, as in the present embodiment, the app icon 49 corresponding to one or more display images not displayed in the preview area 43 is displayed in the predetermined area 50. As a result, the user U can recognize that the app icon 49 displayed in the predetermined area 50 is an icon once dragged and dropped.

B. Modifications

The present disclosure is not limited to the embodiment exemplified above. Specific aspects of modification are exemplified below. Two or more aspects freely selected from the following examples may be combined.

B-1. First Modification

In the embodiment, a case is described in which when the split layout of the preview area 43 changes from the layout A to the layout B, and thereafter does not change into another layout different from both of the layouts A and B, the first splitter 233 splits the preview area 43 into the split areas 44 based on the layout A, and the number of splits of the layout A is less than that of splits of the layout B. In this case, in the present embodiment, the image updater 235 displays, in each of the plurality of split areas 44, the display image that is displayed based on the layout A that is immediately before the layout A is changed into the layout B. However, the present invention is not limited thereto. For example, when the split layout of the preview area 43 changes from the layout A into the layout B, thereafter changes into another layout different from both the layout A and the layout B, the first splitter 233 splits the preview area 43 into the split areas 44 based on the layout A. In such a case, the display image that is displayed in the layout A, before the layout A is changed into the layout B may be displayed in each of the split areas 44.

For example, when the layout of the preview area 43 changes from the layout corresponding to the split icon 47c into the layout corresponding to the split icon 47a, and thereafter further changes into the layout corresponding to the split icon 47d, the first splitter 233 splits the preview area 43 into the split areas 44 based on the layout corresponding to the split icon 47c. In this case, the image updater 235 displays, in each of the plurality of split areas 44, the display image displayed in the layout corresponding to the split icon 47c that is before the current layout was changed into the layout corresponding to the split icon 47a.

B-2. Second Modification

In the embodiment and the first modification, when the information processing apparatus 1 rotates during display of the preview screen is not specified. However, the contents of the preview screen may be updated so as to be easily viewable for the user U.

Figure 24:
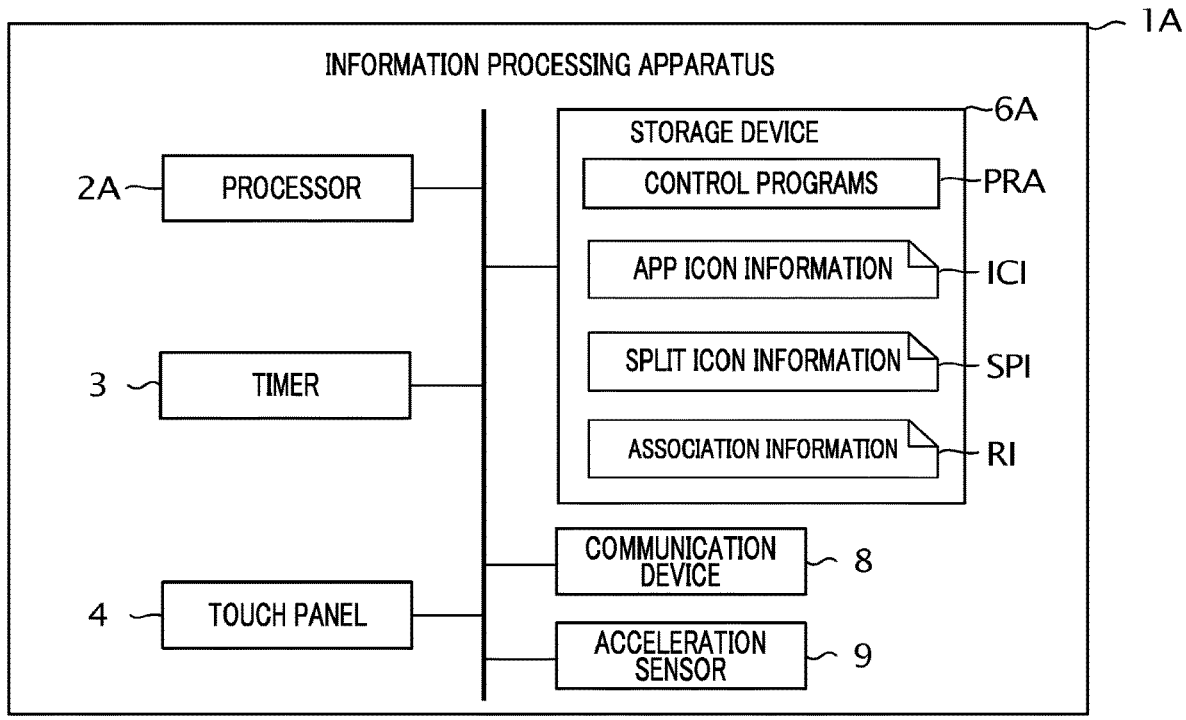
FIG. 24 is a block diagram illustrating a configuration of an information processing apparatus 1A according to a second modification.

FIG. 24 is a block diagram illustrating a configuration of an information processing apparatus 1A according to a second modification. The information processing apparatus 1A includes, for example, a processor 2A, a timer 3, a touch panel 4, a storage device 6A, a communication device 8, and an acceleration sensor 9.

The processor 2A controls the entire information processing apparatus 1A, and includes, for example, one or more chips. The storage device 6A is a recording medium that is readable by the processor 2A. The storage device 6A stores programs including control programs PRA executed by the processor 2, app icon information ICI, split icon information SPI, association information RI, and various types of information used by the processor 2A.

The acceleration sensor 9 measures acceleration applied to the information processing apparatus 1A. As the acceleration sensor 9, for example, a sensor that measures acceleration in each direction of three axes orthogonal to each other is suitably used. As a gyro sensor, for example, a sensor that measures angular velocity or angular acceleration around each of three axes orthogonal to each other is suitably used. The acceleration sensor 9 measures the gravitational acceleration applied in each of the directions of the three axes, whereby the processor 2A can identify the direction of gravity applied to the information processing apparatus 1A. Then, the processor 2A identifies the inclination of the information processing apparatus 1A on the basis of the direction of gravity applied to the information processing apparatus 1A. The information processing apparatus 1A may include an angular velocity sensor instead of the acceleration sensor 9.

Figure 25:
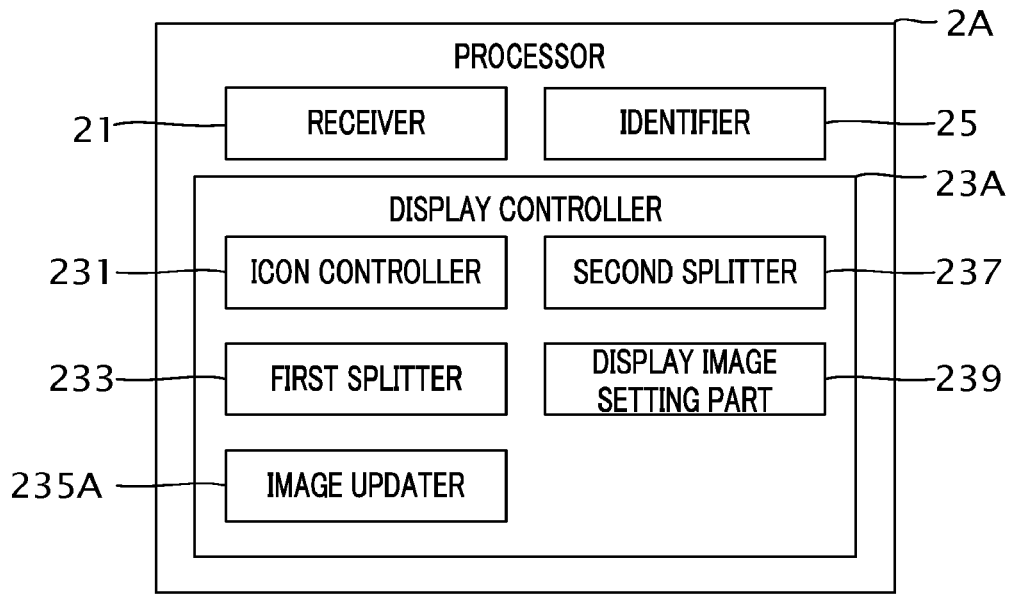
FIG. 25 is a functional block diagram of the information processing apparatus 1A according to the second modification.

FIG. 25 is a functional block diagram of the information processing apparatus 1A according to the second modification. The processor 2A acts as the receiver 21, a display controller 23A, and an identifier 25 by reading a control program PRA from the storage device 6 and executing the read control program PRA. The display controller 23A includes an icon controller 231, a first splitter 233, an image updater 235A, a second splitter 237, and a display image setting part 239.

The identifier 25 identifies the inclination of the information processing apparatus 1A on the basis of the acceleration measured by the acceleration sensor 9. Then, on the basis of the inclination of the information processing apparatus 1A, the identifier 25 identifies a side closest to directly above the user U in the gravity direction among the four sides of the display area 40.

The image updater 235A adjusts the orientation of each app icon 49 such that the upward direction of the plurality of app icons 49 coincides with the direction from the center of gravity of the display area 40 toward the side identified by the identifier 25. The orientation of each of the split icons 47 is not adjusted. The center of gravity refers to a point at which the sum of the first moment of area (static moment) is zero in a target shape in plan view, and refers to an intersection of diagonals when the shape is rectangular. In addition, the image updater 235A adjusts the orientation of the display image displayed in the split areas 44 such that the upward direction of the display images coincides with the direction from the center of gravity of the display area 40 toward the side identified by the identifier 25. An adjustment example of the app icon 49 will be described with reference to FIGS. 26 and 27.

Figure 26:
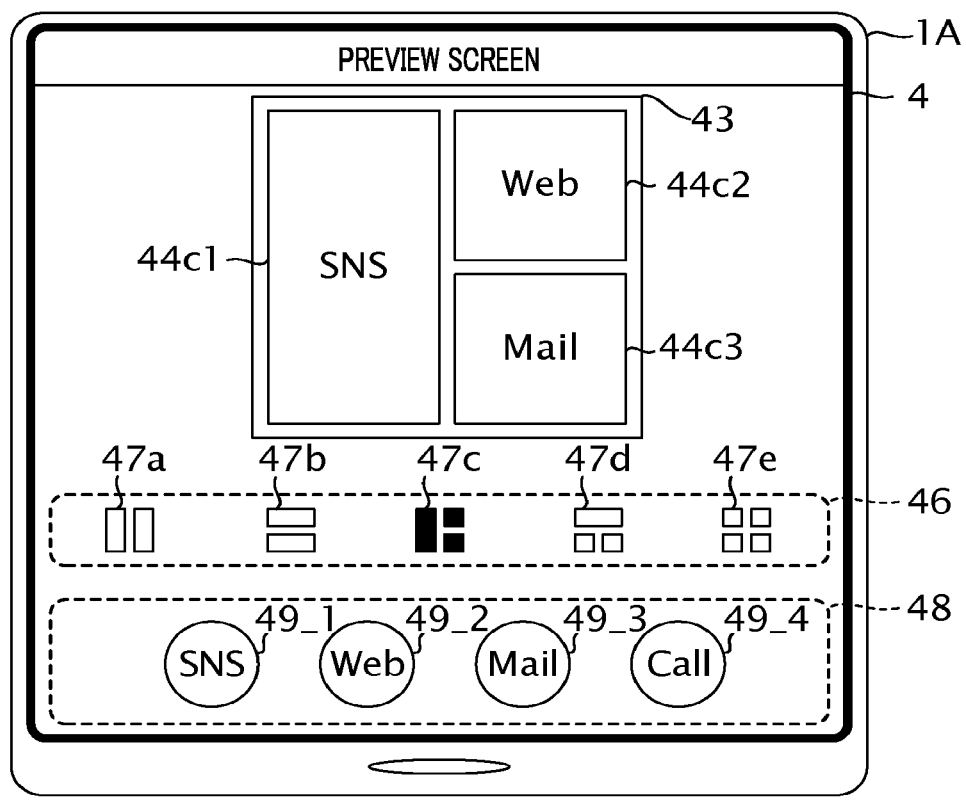
FIG. 26 is a diagram illustrating a preview screen when the inclination of the information processing apparatus 1A is zero.

FIG. 26 is a diagram illustrating a preview screen when the inclination of the information processing apparatus 1A is zero. FIG. 26 illustrates a state after the split icon 47c is tapped. When the inclination of the information processing apparatus 1A is zero, the side closest to directly above the user U in the direction of gravity among the four sides of the display area 40 is the upper side of the display area 40. In one example illustrated in FIGS. 26 and 27, the image updater 235A does not adjust the orientation of each of the app icons 49.

Figure 27:
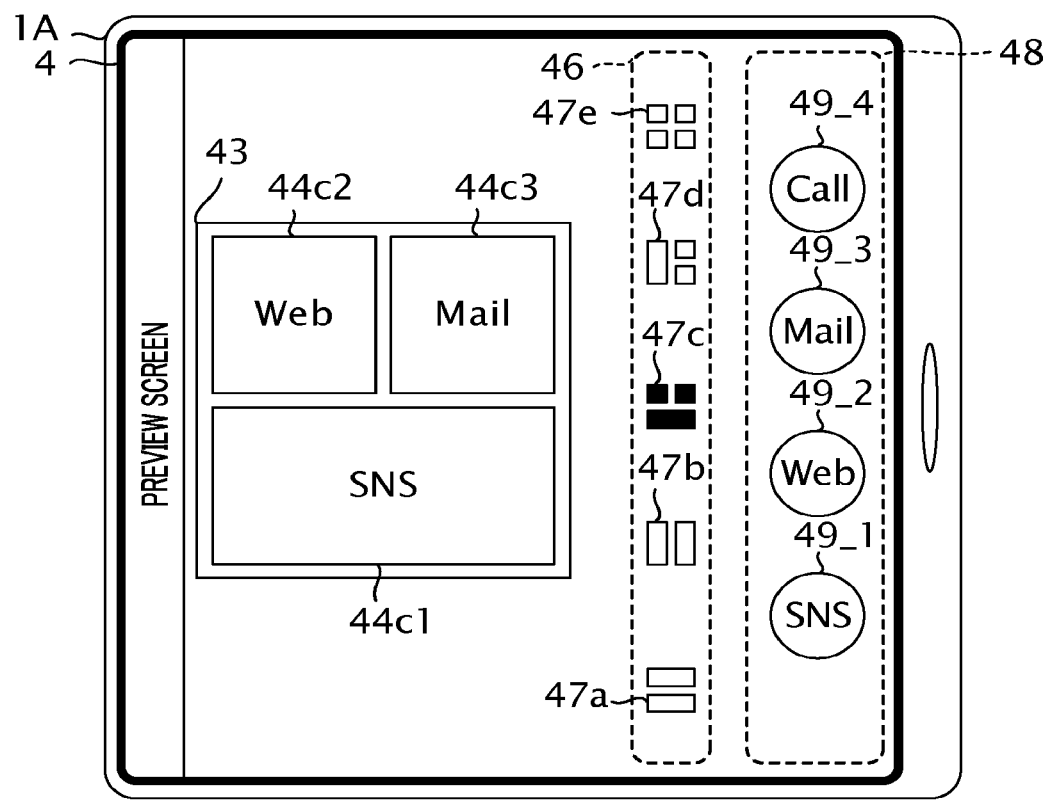
FIG. 27 is a diagram illustrating a preview screen when the inclination of the information processing apparatus 1A is 90 degrees in the counterclockwise direction.

FIG. 27 is a diagram illustrating a preview screen in a case in which the inclination of the information processing apparatus 1A is 90 degrees in the counterclockwise direction. In one example illustrated in FIG. 27, the side closest to directly above the user U in the gravity direction among the four sides of the display area 40 is the right side of the display area 40 in FIG. 26. The image updater 235A adjusts the orientation of each of the app icons 49 such that the upward direction of the app icons 49 coincides with the direction from the center of gravity of the display area 40 toward the right side of the display area 40. Furthermore, the image updater 235A adjusts the orientations of the display images such that each upward direction of the display images coincides with the direction from the center of gravity of the display area 40 toward the right side of the display area 40 in FIG. 26.

In one example illustrated in FIG. 27, the image updater 235A rotates each of the app icons 49 clockwise by 90 degrees. Furthermore, the image updater 235A rotates each of the display images clockwise by 90 degrees.

As described above, according to the second modification, even when the information processing apparatus 1A is rotated 90 degrees counterclockwise, the processor 2 can set the preview screen in a state easily viewable by the user U. Even when the information processing apparatus 1A is rotated 90 degrees clockwise, the preview screen can be set in a state easily viewable by the user U, in a manner similar to a case in which the information processing apparatus 1A is rotated 90 degrees counterclockwise. In addition, the processor 2A does not adjust the orientation of each of the split icons 47. Therefore, the processing load is reduced as compared with a case of adjusting all the orientations in the preview screen.

B-3. Third Modification

In the embodiment, the first modification, and the second modification, the information processing apparatus 1 is foldable, and the touch panel 4 is provided only on the outer surface when folded, but the present invention is not limited thereto. For example, the information processing apparatus 1 may be provided with the touch panel 4 on both the outer surface and the inner surface when folded.

Figure 28:
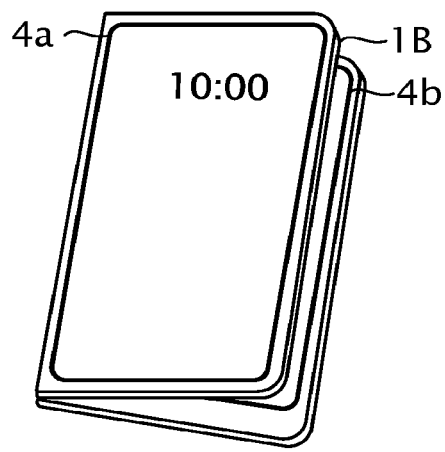
FIG. 28 is a perspective view illustrating an external appearance of an information processing apparatus 1B according to a third modification.

FIG. 28 is a perspective view illustrating an external appearance of an information processing apparatus 1B according to the third modification. The information processing apparatus 1B includes a touch panel 4a and a touch panel 4b. The information processing apparatus 1B illustrated in FIG. 28 is in a folded state. When the information processing apparatus 1B is folded, the touch panel 4a is provided on an outer surface of the information processing apparatus 1B, and the touch panel 4b is provided on an inner surface of the information processing apparatus 1B.

Figure 29:
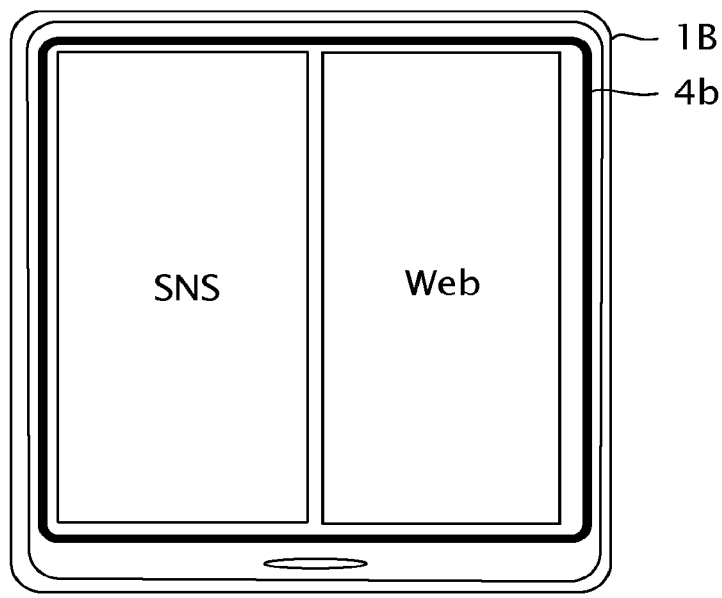
FIG. 29 is a plan view illustrating an external appearance of the information processing apparatus 1B that is unfolded.

FIG. 29 is a plan view illustrating an external appearance of the information processing apparatus 1B that is unfolded. With the information processing apparatus 1 being unfolded, the user U operates the information processing apparatus 1B by touching the touch panel 4b.

The embodiment, the first modification, and the second modification can be applied not only to the foldable information processing apparatus 1 but also to a non-foldable information processing apparatus. Specifically, any type of information processing apparatus can be adopted as the information processing apparatus 1. For example, the information processing apparatus 1 may be a terminal-type information apparatus such as a personal computer, or a portable information terminal such as a notebook computer, a wearable terminal, or a tablet terminal.

B-4. Fourth Modification

In the foregoing aspects, the split icon area 46 is located below the preview area 43 in the non-preview area 42, and the app icon 49 is located below the split icon area 46 in the non-preview area 42. However, the present invention is not limited thereto. For example, the split icon area 46 may be located on one of the left and right sides of the preview area 42 in the non-preview area 43, and the app icon 49 may be located on the other of the left and right sides of preview area 43 in the non-preview area 42.

B-5. Fifth Modification

In the foregoing aspects, as an example of an input operation for selecting one split icon 47, description is given of a tap operation for one split icon 47 by the user U. However, the present invention is not limited thereto. Another example of an input operation for selecting one split icon 47 is given by pressing one split icon 47 by the user U for a predetermined period of time or longer.

B-6. Sixth Modification

In the foregoing aspects, as the predetermined input operations for further splitting the split area 44, description is given of reducing the split area 44, and double-tapping the split area 44. However, the present invention is not limited thereto. Another example of the predetermined operation may be pinching the split area 44 by the user U.

B-7. Seventh Modification

In the foregoing aspects, the app icon 49 is displayed in the preview area 43, but the app icon 49 may not be displayed.

Figure 30:
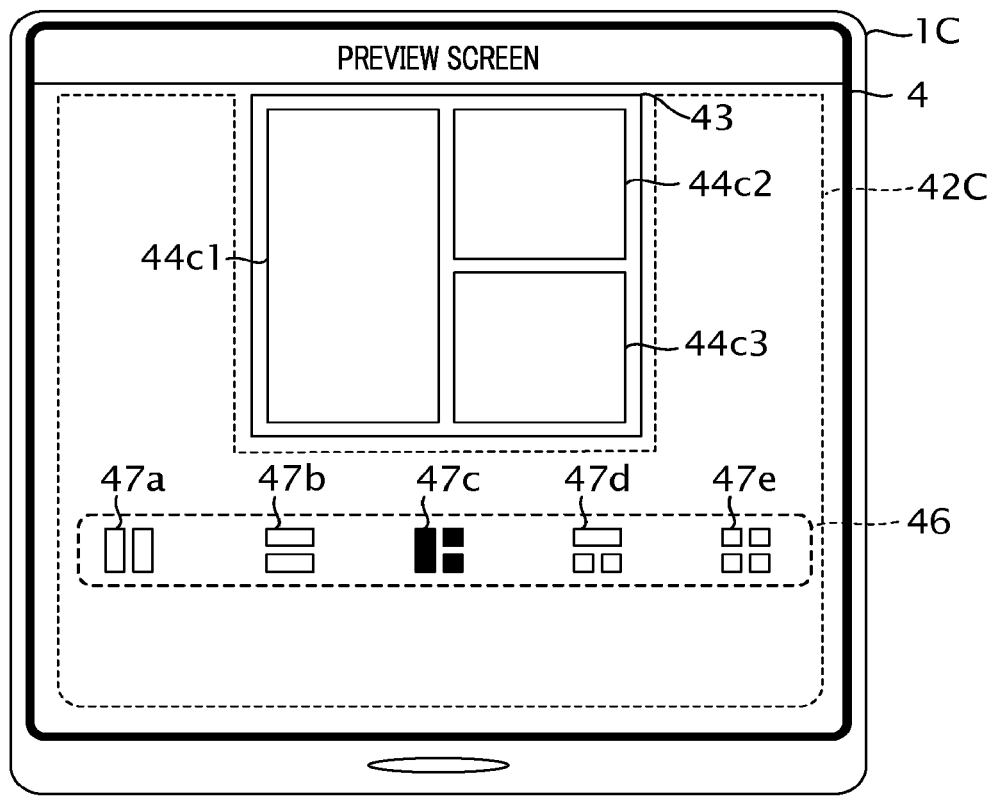
FIG. 30 is a diagram illustrating an example of a preview screen in an information processing apparatus 1C according to a seventh modification.

FIG. 30 is a diagram illustrating an example of a preview screen in an information processing apparatus 1C according to a seventh modification. In the information processing apparatus 1C, a non-preview area 42C according to the seventh modification is different from the embodiment in that the non-preview area 42C has a split icon area 46 and does not have an app icon area 48. The split icon 47 corresponding to the desired split layout is tapped by the user U from among the split icons 47. Next, any one of the split areas 44, which are obtained by splitting the preview area 43 based on the split layout corresponding to the tapped split icon 47, is tapped by the user U. When a tap operation by the user U is received by the receiver 21, the processor 2 of the information processing apparatus 1C splits the display area based on the split layout corresponding to the tapped split icon 47. By an input operation of the user U, a screen for associating an app with the display area 40 is displayed on a screen different from the preview screen. According to the seventh modification, in a manner similar to that in the embodiment, it is possible to suppress the burden on the user U in splitting the display area 40.

B-8: Other Modifications (1) The block diagrams for the aspects show blocks of functional units. These functional blocks (components) are implemented by an optional combination of hardware, software or both. In addition, means for how functional blocks are realized are not particularly limited. That is, each functional block may be implemented by one device physically combined, logically combined, or both, or may be implemented by devices in which two or more devices physically shared, logically separated, or both, are directly, indirectly or both (for example, wired and/or wirelessly) connected.

(2) The order of the processing procedure, sequence, flowchart, and the like in each aspect may be changed as long as there is no conflict. For example, for the methods described herein, elements of various steps are presented in an example order and are not limited to the particular order presented.

(3) In each aspect, the input information and the output information and the like may be stored in a specific location (for example, a memory) or may be managed in a management table. The input information and output information and the like can be overwritten, updated, or additionally written. The output information and the like may be deleted. The input information and the like may be transmitted to another device.

(4) In the foregoing aspects, the determination may be made by a value represented by one bit (0 or 1), may be made by a true value or a false value (Boolean: true or false), or may be made by comparison of numerical values (for example, comparison with a predetermined value).

(5) In the foregoing aspects, the storage device 6 is a recording medium that can be read by the processor 2, and examples thereof include the ROM and the RANI. However, the storage device 6 is a flexible disk, a magneto-optical disk (for example, a compact disc, a digital versatile disc, or a Blu-ray (registered trademark) disc), a smart card, a flash memory device (for example, a card, a stick, or a key drive), a compact disc-ROM (CD-ROM), a register, a removable disk, a hard disk, a floppy (registered trademark) disk, a magnetic strip, a database, a server, or another appropriate storage medium. The program may be transmitted from a network, and it may be transmitted from a communication network via a telecommunication line. The storage device 6A is also the same as the storage device 6.

(6) Each aspect may be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), other appropriate systems, and a next-generation system extended on the basis of these systems.

(7) In the foregoing aspects, the described information, signals, and the like may be represented using any of a variety of different techniques. For example, data, instructions, commands, information, signals, bits, symbols, chips, and the like that may be mentioned throughout the above description may be represented by voltages, currents, electromagnetic waves, magnetic fields or particles, optical fields or photons, or any combination thereof. The terms used in the present specification and terms necessary for understanding the present specification may be replaced with terms having the same or similar meanings.

(8) Each function illustrated in FIGS. 8 and 25 is implemented by an optional combination of hardware and software. In addition, each function may be implemented by a single device, or it may be implemented by two or more devices configured separately from each other.

(9) The program exemplified in each of the embodiment should be interpreted broadly to mean an instruction, an instruction set, a code, a code segment, a program code, a subprogram, a software module, an application, a software application, a software package, a routine, a subroutine, an object, an executable file, an execution thread, a procedure, a function, or the like, regardless of whether it is referred to by software, firmware, middleware, microcode, or a hardware description language, or referred to as another name. In addition, software, instructions, and the like may be transmitted and received via a transmission medium. For example, when software is transmitted from a website, a server, or another remote source by using a wired technology such as a coaxial cable, an optical fiber cable, a twisted pair, and a digital subscriber line (DSL) or a wireless technology such as infrared ray, radio, and microwave, or both, these wired or wireless technologies, or both are included in the definition of the transmission medium.

(10) In the foregoing embodiments, the information, the parameter, and the like may be represented by an absolute value, may be represented by a relative value from a predetermined value, or may be represented by another corresponding piece of information.

(11) The names used for the parameters described above are not limited in any respect. Mathematical expressions and the like using these parameters may be different from those explicitly disclosed in the present specification.

(12) In the foregoing embodiment, the information processing apparatus 1 may be a mobile station. The mobile station may be referred to by those skilled in the art as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terms.

(13) In the embodiment, the description "based on" does not mean "based only on" unless explicitly stated otherwise. In other words, the description "based on" means both "based only on" and "based at least on".

(14) Any reference to elements using designations such as "first," "second," and the like as used herein does not generally limit the amount or order of those elements. These designations may be used herein as a convenient way to distinguish between two or more elements. Thus, reference to the first and second elements does not imply that only two elements may be employed therein or that the first element must precede the second element in any way.

(15) As long as "including", "comprising", and variations thereof are used in the present specification or claims in the embodiment, these terms are intended to be inclusive in a manner similar to the term "comprising". The term "or" used in the present specification or claims is not intended to be an exclusive OR.

(16) Throughout the present application, for example, if articles are added by translation, such as "a", "an", and "the" in English, these articles include a plurality unless the context clearly indicates otherwise.

(17) It will be apparent to those skilled in the art that the invention is not limited to the embodiments described herein. The present invention can be implemented as modifications and variations without departing from the spirit and scope of the present invention defined based on the scope of the claims. Accordingly, the present specification herein is for the purpose of illustrative description and has no restrictive meaning to the present invention. In addition, aspects selected from the aspects exemplified in the present specification may be combined.

DESCRIPTION OF REFERENCE SIGNS

1, 1A, 1B: information processing apparatus
21: receiver
23, 23A: display controller
40: display area
42: non-preview area
43: preview area
44: split area
46: split icon area
47: split icon
49: app icon
51: re-split icon
231: icon controller
233: first splitter
235: image updater
235A: image updater
237: second splitter
239: display image setting part
U: user

The invention claimed is:
1. An information processing apparatus comprising:
a receiver configured to receive an input operation of a user; and
a display controller configured to display, in a display area having a first area and a second area, an image,
the display controller includes:
an icon controller configured to display, in the second area, a plurality of first icons associated one-to-one with a plurality of different layouts in splitting the first area, and
a first splitter configured to split the first area into a plurality of split areas based on a layout corresponding to a selected first icon when the receiver receives an input operation for selecting any of the plurality of first icons,
wherein:
the icon controller is further configured to display, in the second area, a plurality of second icons,
the plurality of second icons correspond one-to-one to a plurality of display images, and
the display controller further includes a display image setting part, wherein when the receiver receives an input operation for associating any one of the plurality of second icons with any one of the plurality of split areas, the display image setting part is configured to display, in the one of the split areas, a display image corresponding to the associated second icon.
2. An information processing apparatus comprising:
a receiver configured to receive an input operation of a user; and a display controller configured to display, in a display area having a first area and a second area, an image, the display controller includes:

an icon controller configured to display, in the second area, a plurality of first icons associated one-to-one with a plurality of different layouts in splitting the first area, and a first splitter configured to split the first area into a plurality of split areas based on a layout corresponding to a selected first icon when the receiver receives an input operation for selecting any of the plurality of first icons, wherein:

the icon controller is configured to further display, in the second area, a plurality of second icons, and the display controller further includes:

a second splitter, wherein when the receiver receives a predetermined input operation for any one of the plurality of split areas, the second splitter is configured to split the split area into a first sub-split area and a second sub-split area, and a display image setting part, wherein when the receiver receives an input operation for associating any one of the plurality of second icons with the first sub-split area, the display image setting part is configured to display, in the first sub-split area, a display image corresponding to the associated second icon.

3. The information processing apparatus according to claim 2, wherein the predetermined input operation is an input operation for reducing a size of the split area or an input operation for double-tapping the split area.

4. The information processing apparatus according to claim 3, wherein:

when the split area is split into the first sub-split area and the second sub-split area by the second splitter, the icon controller is further configured to display, in the second area, the plurality of first icons and one third icon, and the third icon corresponds to a layout in which the first area is split into a plurality of split areas that include the first sub-split area and the second sub-split area.

5. The information processing apparatus according to claim 2, wherein:

when the split area is split into the first sub-split area and the second sub-split area by the second splitter, the icon controller is further configured to display, in the second area, the plurality of first icons and one third icon, and the third icon corresponds to a layout in which the first area is split into a plurality of split areas that include the first sub-split area and the second sub-split area.

6. An information processing apparatus comprising:

a receiver configured to receive an input operation of a user; and a display controller configured to display, in a display area having a first area and a second area, an image, the display controller includes:

an icon controller configured to display, in the second area, a plurality of first icons associated one-to-one with a plurality of different layouts in splitting the first area, and a first splitter configured to split the first area into a plurality of split areas based on a layout corresponding to a selected first icon when the receiver receives an input operation for selecting any of the plurality of first icons, wherein:

a plurality of layouts of splitting the first area includes a first layout and a second layout, the number of split areas defined by the first layout is less than that defined by the second layout, and the display controller further includes an image updater, wherein when the first area is split by the first splitter into the plurality of split areas based on the second layout in a state in which the display image is displayed in each of the plurality of split areas defined by the first layout, the image updater is configured to display, in any one of the plurality of split areas corresponding to the second layout, the display image that is displayed in each of the plurality of split areas corresponding to the first layout.

7. An information processing apparatus comprising:

a receiver configured to receive an input operation of a user; and a display controller configured to display, in a display area having a first area and a second area, an image, the display controller includes:

an icon controller configured to display, in the second area, a plurality of first icons associated one-to-one with a plurality of different layouts in splitting the first area, and a first splitter configured to split the first area into a plurality of split areas based on a layout corresponding to a selected first icon when the receiver receives an input operation for selecting any of the plurality of first icons, wherein:

a plurality of layouts of splitting the first area includes a first layout and a second layout, the number of split areas defined by the first layout is less than that defined by the second layout, and the display controller further includes an image updater, wherein when the first splitter splits the first area into the plurality of split areas based on the second layout after the split layout of the first area changes from the second layout into the first layout, the image updater is configured to display, in each of the plurality of split areas, the display image that is displayed in each of the plurality of split areas corresponding to the second layout that is immediately before the split layout of the first area changes into the first layout.

8. An information processing apparatus comprising:

a receiver configured to receive an input operation of a user; and a display controller configured to display, in a display area having a first area and a second area, an image, the display controller includes:

an icon controller configured to display, in the second area, a plurality of first icons associated one-to-one with a plurality of different layouts in splitting the first area, and a first splitter configured to split the first area into a plurality of split areas based on a layout corresponding to a selected first icon when the receiver receives an input operation for selecting any of the plurality of first icons, wherein:

a plurality of layouts of splitting the first area includes a first layout and a second layout, the number of split areas defined by the first layout is less than that defined by the second layout, and when the split layout of the first area changes from the second layout to the first layout, from among a plurality of display images that are displayed by the display controller in the first area split by the first splitter based on the second layout, the icon controller is configured to display, in the second area, one or more second icons corresponding one-to-one to one or more display images that are not displayed in the first area split by the first splitter based on the first layout.

* * * * *

UNITED STATES PATENT AND TRADEMARK OFFICE
CERTIFICATE OF CORRECTION

| | |
|---|---|
| PATENT NO. | : 11,966,657 B2 |
| APPLICATION NO. | : 18/040914 |
| DATED | : April 23, 2024 |
| INVENTOR(S) | : Kenichirou Matsumura et al. |

It is certified that error appears in the above-identified patent and that said Letters Patent is hereby corrected as shown below:

In the Claims

In Claim 4, Column 27, Line 33, please change "according to claim 3" to --according to claim 2--.

In Claim 5, Column 27, Line 42, please change "according to claim 2" to --according to claim 3--.

Signed and Sealed this
Twentieth Day of August, 2024

Katherine Kelly Vidal
*Director of the United States Patent and Trademark Office*